US009742990B2

(12) United States Patent
Matsuzawa et al.

(10) Patent No.: US 9,742,990 B2
(45) Date of Patent: Aug. 22, 2017

(54) IMAGE FILE COMMUNICATION SYSTEM WITH TAG INFORMATION IN A COMMUNICATION NETWORK

(71) Applicants: OLYMPUS IMAGING CORP., Shibuya-ku, Tokyo (JP); Olympus Corporation, Shibuya-ku, Tokyo (JP)

(72) Inventors: Yoshinori Matsuzawa, Hachioji (JP); Kazuhiro Sato, Sagamihara (JP); Sumio Kawai, Hachioji (JP); Osamu Nonaka, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 497 days.

(21) Appl. No.: 14/141,153

(22) Filed: Dec. 26, 2013

(65) Prior Publication Data

US 2014/0226029 A1 Aug. 14, 2014

(30) Foreign Application Priority Data

Feb. 14, 2013 (JP) ................................. 2013-027175

(51) Int. Cl.
*H04L 12/28* (2006.01)
*H04N 5/232* (2006.01)
*H04N 1/32* (2006.01)

(52) U.S. Cl.
CPC ..... *H04N 5/23222* (2013.01); *H04N 1/32128* (2013.01); *H04N 5/23216* (2013.01); *H04N 5/23219* (2013.01); *H04N 2201/3208* (2013.01); *H04N 2201/3246* (2013.01)

(58) Field of Classification Search
CPC .......... H04N 5/23222; H04N 1/32128; H04N 5/23219; H04N 5/23216; H04N 2201/3208; H04N 2201/3246
See application file for complete search history.

(56) References Cited

U.S. PATENT DOCUMENTS

| | | | |
|---|---|---|---|
| 2002/0078157 A1* | 6/2002 | Matsumoto | H04L 51/08 709/206 |
| 2005/0001024 A1* | 1/2005 | Kusaka | H04N 1/00281 235/375 |
| 2007/0200922 A1* | 8/2007 | Ueno | H04N 7/15 348/14.08 |

(Continued)

FOREIGN PATENT DOCUMENTS

| | | |
|---|---|---|
| JP | 11-284945 | 10/1999 |
| JP | 2002-176576 A | 6/2002 |

(Continued)

OTHER PUBLICATIONS

Office Action issued is corresponding Japanese Patent Application No. 2013-027175 on Nov. 29, 2016, consisting of 5 pp. (English Translation Provided).

Primary Examiner — Abdelnabi O Musa
(74) Attorney, Agent, or Firm — Volpe and Koenig, P.C.

(57) ABSTRACT

An image file recorded on a non-transitory computer readable recording medium is presented. The image file is readable by a transmitting device in communication with a plurality of transceiving devices. The image file includes electronic image data, and tag information including transmission route information for transmitting the image file to at least one of the plurality of transceiving devices.

12 Claims, 21 Drawing Sheets

(56) References Cited

U.S. PATENT DOCUMENTS

2010/0141778 A1* 6/2010 Basson .................. H04N 5/232
                                                      348/207.1
2010/0157096 A1* 6/2010 Park .................. G06F 17/30259
                                                      348/231.3
2011/0310259 A1* 12/2011 Mikawa .................. H04N 5/232
                                                      348/207.1

FOREIGN PATENT DOCUMENTS

| JP | 2003116089 A | 4/2003 |
| JP | 2003244385 A | 8/2003 |
| JP | 2009094946 A | 4/2009 |
| JP | 2011061294 A | 3/2011 |

\* cited by examiner

IMAGE FILE COMMUNICATION SYSTEM WITH TAG INFORMATION IN A COMMUNICATION NETWORK

CROSS REFERENCE TO RELATED APPLICATION

This application is based upon and claims the benefit of priority from Japanese Patent Application No. 2013-027175, filed on Feb. 14, 2013, the entire contents of which are incorporated herein by reference.

FIELD OF THE INVENTION

The disclosure relates to a computer readable recording medium, a transmitting device, a management server, and an image transmitting method.

BACKGROUND

In imaging devices such as digital cameras, a technique of applying copyright information to captured image data has been known. In this technique, a photographer's name, a photographer's handwritten signature, a photographer's ID, and the like are given to the captured image data as copyright information, and recorded on a recording medium.

Social networking services (SNS) and photo sharing websites are currently gaining a growing number of users to connect with other users all over the world. For example, a server providing SNS causes posting information from an account followed by a user to be displayed on a web site of another user provided by the server. In other words, by following other people's accounts, a user causes posting information published by the followed accounts to be displayed on his/her web site.

The embodiments of the invention described herein solve a need in the art for protecting personal information or copyrighted works transmitted to a server, such as a SNS.

SUMMARY

In accordance with some embodiments, an image file recorded on a computer readable recording medium, a transmitting device, a management server, and an image transmitting method are presented.

In some embodiments, an image file recorded on a non-transitory computer readable recording medium is presented. The image file is readable by a transmitting device in communication with a plurality of transceiving devices. The image file includes electronic image data, and tag information including transmission route information for transmitting the image file to at least one of the plurality of transceiving devices.

In some embodiments, a transmitting device is capable of generating an image file including image data and communicating with a plurality of transceiving devices. The transmitting device includes a tag information adding unit configured to add, to the image file, tag information including transmission route information for transmitting the image file to at least one of the plurality of transceiving devices, and a communication unit configured to perform transmission to one of the plurality of transceiving devices based on the transmission route information.

In some embodiments, a management server communicates with a plurality of servers via a network. The management server includes a management server communication unit that acquires an image file from an imaging device in which image data and tag information are recorded, including information identifying the imaging device and mobile terminal information associated with the device, and transmits confirmation information of a copyright to a mobile terminal associated with the device based on the mobile terminal information.

In some embodiments, a transmitting device generates an image file and communicates with an image display transceiver. The transmitting device includes a shooting condition tag information determining unit that determines shooting tag information for image shooting which is added to the image file by determining whether the image display transceiver performs an image display using a first route or a second route as a transmission route of the image file, and a communication unit that transmits the image file through one of the first route and the second route.

In some embodiments, generates an image file and communicates with an image display device. The transmitting device includes a communication unit that transmits the image file, a shooting condition tag information determining unit that determines shooting tag information for image shooting which is added to the image file, and a communication determining unit that determines which of a first route and a second route is used to transmit the image file to the image display device as a transmission route of the image file according to the shooting tag information added to the image file.

In some embodiments, an image transmitting method is executed by a transmitting device that generates an image file including image data and communicates with another device via a network. The method includes adding, to the image file, transmission route information of a transmission route as tag information, determining whether to delete the tag information when the image file is published according to user instructions, and transmitting the image file to a receiving device for image publication according to the transmission route information included in the tag information.

In some embodiments, a non-transitory computer readable recording medium with an executable program recorded thereon is presented. The program instructs a transmitting device having a processor to execute: communication with another device and transmission of an image file in which content data is recorded; adding transmission route information as tag information to the image file for transmitting the image file to be published via the Internet; and transmitting the image file to one of a plurality of receiving devices based on the transmission route information.

In some embodiments, a non-transitory computer readable recording medium with an executable program recorded thereon is presented. The program instructs a management server having a processor to: transmit confirmation information to an external device associated with an imaging device based on transmission destination information of the external device among pieces of information included in tag information added to the image file transmitted from a transmitting device that generates the image file in which image data is recorded; generate digital watermark information on at least part of the tag information based on confirmed information transmitted from the external device as a confirmation result on the confirmation information, and add the digital watermark information to the image file; and cause the image file including the digital watermark information to be published via the Internet based on route information of a transmission route of the image file passing through the management server, which is included in the tag information.

The above and other features, advantages and technical and industrial significance of this invention will be better understood from the following detailed description in connection with the accompanying drawings.

DETAILED DESCRIPTION OF THE PREFERRED EMBODIMENTS

Figure 1:
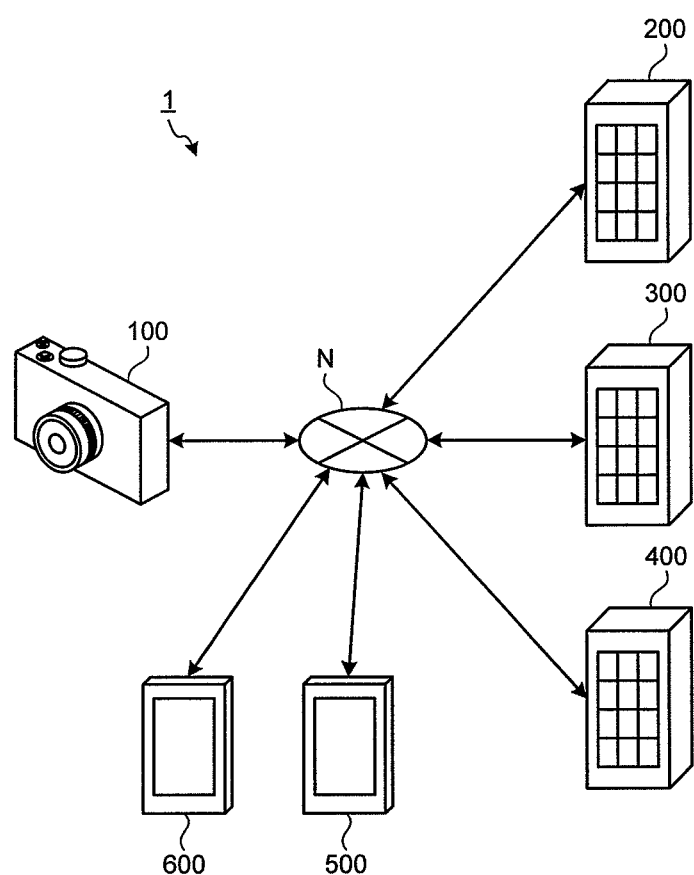
FIG. 1 is a schematic diagram illustrating a configuration of an exemplary image communication system according to some embodiments.

Exemplary embodiments will be described with reference to the accompanying drawings where the same components are denoted by the same reference numerals.

FIG. 1 is a schematic diagram illustrating a configuration of an image communication system 1 according to some embodiments.

The image communication system 1 illustrated in FIG. 1 preferably includes an imaging device 100, an image reception server 200, a management server 300, an image display server 300, and one or mobile devices 500, 600. The imaging device 100 images a subject to generate image data and transmits an image file including the image data to the outside via a network N. The image reception server 200 receives the image file transmitted from the imaging device 100 via the network N and transmits the image file to a server corresponding to tag information of route information of a transmission route of the image file, including at least some of a plurality of servers which are attached to the image file. The management server 300 manages the image file based on tag information attached to an image file transmitted from a server in communication with the imaging device 100 via a network. The image display server 400 receives the image file from the image reception server 200 or the management server 300 via the network N and transmits posting information such as image data or content data according to access from a mobile device 500 or a mobile device 600 which will be described later. The mobile device 500 and the mobile device 600 can access the image display server 400 via the network N or receive information from the management server 300. As described herein, the mobile device 600 can have the similar features and functionality to the mobile device 500. In some embodiments described herein, the imaging device 100 functions as a transmitting device or a communication device.

Figure 2:
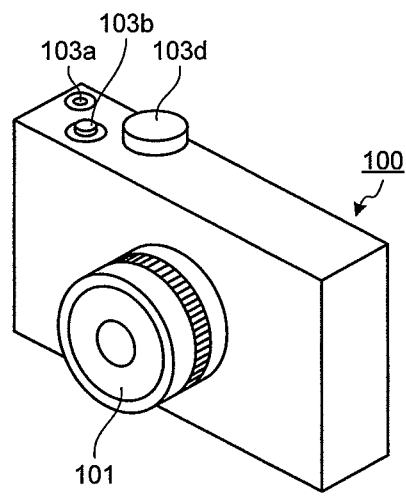
FIG. 2 is a front perspective view of an imaging device illustrating a front side of the imaging device that faces a subject according to some embodiments.
Figure 3:
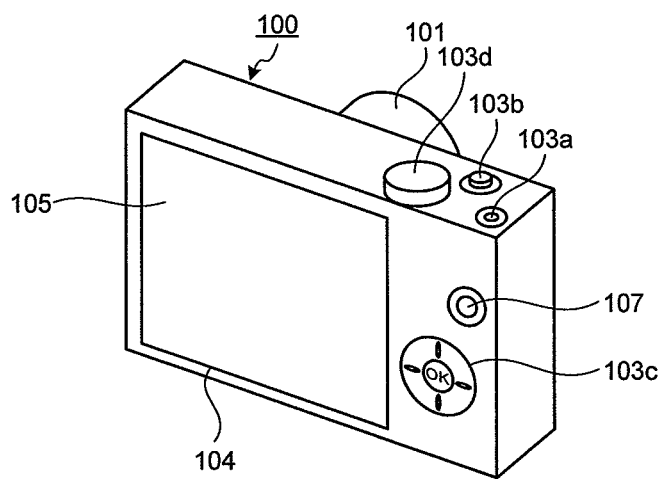
FIG. 3 is a rear perspective view of the imaging device illustrating a back side of the imaging device that faces a user (photographer) according to some embodiments.
Figure 4:
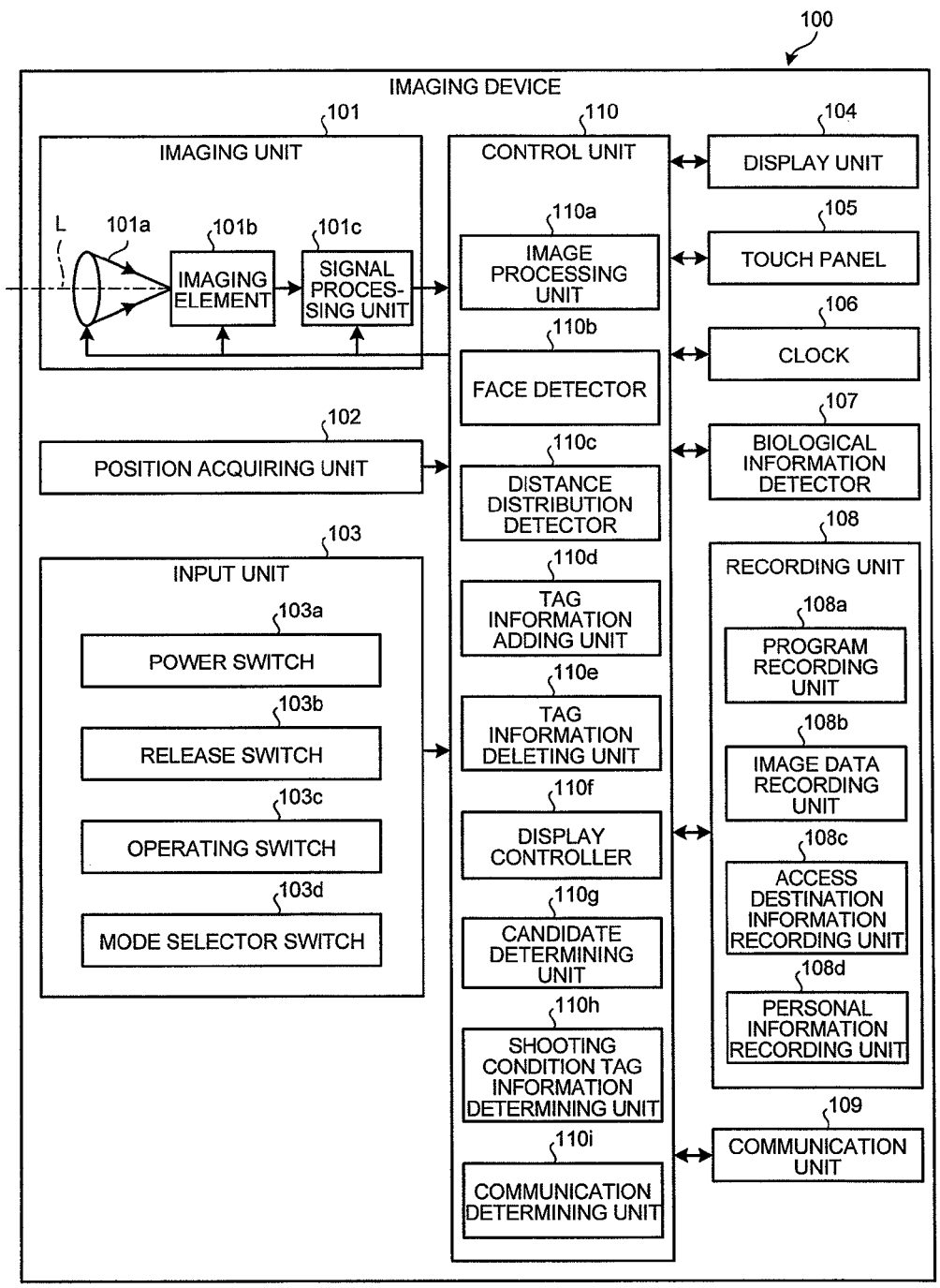
FIG. 4 is a block diagram illustrating a functional configuration of the imaging device according to some embodiments.

The imaging device 100 is described with reference to FIGS. 2-4. FIG. 2 is a front perspective view of the imaging device 100 illustrating a front side of the imaging device 100 that faces a subject. FIG. 3 is a rear perspective view of the imaging device 100 illustrating a back side of the imaging device 100 that faces a user (photographer). FIG. 4 is a block diagram illustrating a functional configuration of the imaging device 100.

The imaging device 100 illustrated in FIGS. 2 to 4 preferably includes an imaging unit 101, a position acquiring unit 102, an input unit 103, a display unit 104, a touch panel 105, a clock 106, a user information detector 107, a recording unit 108, a communication unit 109, and a control unit 110.

The imaging unit 101 captures an image of a subject and generates image data of the subject under control of the control unit 110. The imaging unit 101 preferably includes an optical system 101a, an imaging element 101b, and a signal processing unit 101c.

The optical system 101a collects light from a specified field of view area. The optical system 101a preferably includes a zoom function capable of changing a focal distance, a focus function capable of adjusting a focus, a shutter, a diaphragm, and the like. The optical system 101a changes a focal distance, adjusts a focus, changes an aperture value, or sets a shutter speed in response to an instruction signal input from the control unit 110.

The imaging element 101b receives light collected by the optical system 101a, converts the light into an electrical signal, and outputs the electrical signal to the signal processing unit 101c. The imaging element 101b is configured using a CCD (Charge Coupled Device), a CMOS (Complementary Metal Oxide Semiconductor), or other image sensor that receives light collected by the optical system 101a and converts the light into an electrical signal. The imaging element 101b sequentially generates image data at a specified frame rate, for example, at 30 fps or 60 fps, in response to the instruction signal input from the control unit 110.

The signal processing unit 101c executes an analog process such as a noise reduction process and a gain up process and A/D conversion on an analog signal output from the imaging element 101b, and outputs resultant data to the control unit 110.

The position acquiring unit 102 receives orbital information of satellites transmitted from a plurality of GPS satellites configuring a GPS (Global Positioning System) that is a measuring system for measuring the position of an object on the ground. The position acquiring unit 102 preferably acquires positional information of the imaging device 100 at the time of capturing or image playback based on the received orbital information and outputs the positional information to the control unit 110. The positional information includes, for example, longitude, latitude, and time information.

The input unit 103 preferably includes a power switch 103a that receives an input of an instruction signal indicating power-on or power-off of the imaging device 100, a release switch 103b that receives an input of a release signal instructing the imaging device 100 to perform shooting, an operating switch 103c that receives an input of an instruction signal for changing settings of various kinds of parameters of the imaging device 100, and a mode selector switch 103d that changes a mode of the imaging device 100. The release switch 103b preferably moves up or down when pushed down from the outside, receives an input of a first release signal instructing the imaging device 100 to perform a shooting preparation operation when pushed down halfway, and receives an input of a second release signal instructing the imaging device 100 to perform still image shooting when pushed down fully.

The display unit 104 preferably displays a live view image corresponding to image data imaged by the imaging unit 101, an image corresponding to image data that has been subjected to image processing executed by an image processing unit 110a, and an image corresponding to image data recorded in the recording unit 108. The display unit 104 is preferably configured using a display panel such as a liquid crystal panel or an organic EL (Electro Luminescence) panel. Examples of the image display include a rec view display in which image data immediately after shooting is displayed during a specified period of time (for example, 3 seconds), a playback display in which image data recorded in the recording unit 108 is played back, and a live view image display in which live view images corresponding to image data consecutively generated by the imaging unit 101 are sequentially displayed in time series. The display unit 104 can also display operation information of the imaging device 100, information on shooting such as an exposure value or an aperture value, and other information that would be useful to the user.

The touch panel 105 is disposed on a display screen of the display unit 104. The touch panel 105 detects a touch position of a finger, a touch pen, or any other external object, and outputs a positional signal corresponding to the detected touch position to the control unit 110. The touch panel 105 detects the position which the user touches based on information displayed on the display unit 104, and receives an input of an instruction signal instructing an operation to be performed by the imaging device 100 according to the detected touch position. The touch panel 105 can be a resistive type, a capacitive type, an optical type, or other known touch panels in the art. In some embodiments, a touch panel of any type can be applied. In some embodiments discussed herein, the touch panel 105 functions as a permission information input unit that receives an input of permission information on portrait rights of a subject.

The clock 106 has a clock function and a shooting date and time determining function. The clock 106 outputs date and time data to the control unit 110 in order to correlate date and time data to image data imaged by the imaging unit 101.

The biological information detector 107 is preferably disposed on the outside of the imaging device 100. The user information detector 107 can be a biological information detector that detects biological information of a photographer when image data is generated by the imaging device 100. More particularly, the biological information detector can detect biological information used to perform personal authentication such as the photographer's fingerprint, vein, muscle current, or other biological information. The biological information detector 107 is configured, for example, using a biological information sensor capable of performing personal authentication such as a fingerprint detecting sensor, a vein detecting sensor, a muscle current sensor, or the like. Further, the biological information detector 107 can detect biological information of the subject when touched from the outside. The biological information detector 107 can detect any one of a vocal print, a secret code, a user ID, and a password. The biological information detector 107 can also perform face authentication through a small-sized camera. In other words, the biological information detector 107 may be applied to an imaging unit having a face determining function of capturing the user's face and detecting a feature point of the user's face.

The recording unit 108 records, for example, various kinds of programs for operating the imaging device 100 and various kinds of data or parameters used when the program is being executed. The recording unit 108 preferably includes a program recording unit 108a, an image data recording unit 108b, an access destination information recording unit 108c, and a personal information recording unit 108d. The program recording unit 108a stores the programs executed by the imaging device 100. The image data recording unit 108b records image data, image processing information used when image data is developed, imaging information used when image data is imaged, thumbnail image data, and an image file associated with tag information used for personal authentication. The access destination information recording unit 108c records identification information (IP address) of the imaging device 100 necessary to perform wireless communication with another image reception server 200, a password corresponding to the identification information, an account used when content data including an image file is transmitted to the image reception server 200, an IP address of the image reception server 200, and the like. The personal information recording unit 108d records owner information indicating an owner of the imaging device 100 and confirmation destination information for the mobile device 500 associated with the imaging device 100. Examples of the confirmation destination information include, without limitation, a mail address used to transmit mail to the mobile device 500, a telephone number, and owner information of the mobile device 500. The recording unit 108 is configured with a semiconductor memory such as flash memory or DRAM (Dynamic Random Access Memory).

Figure 5:
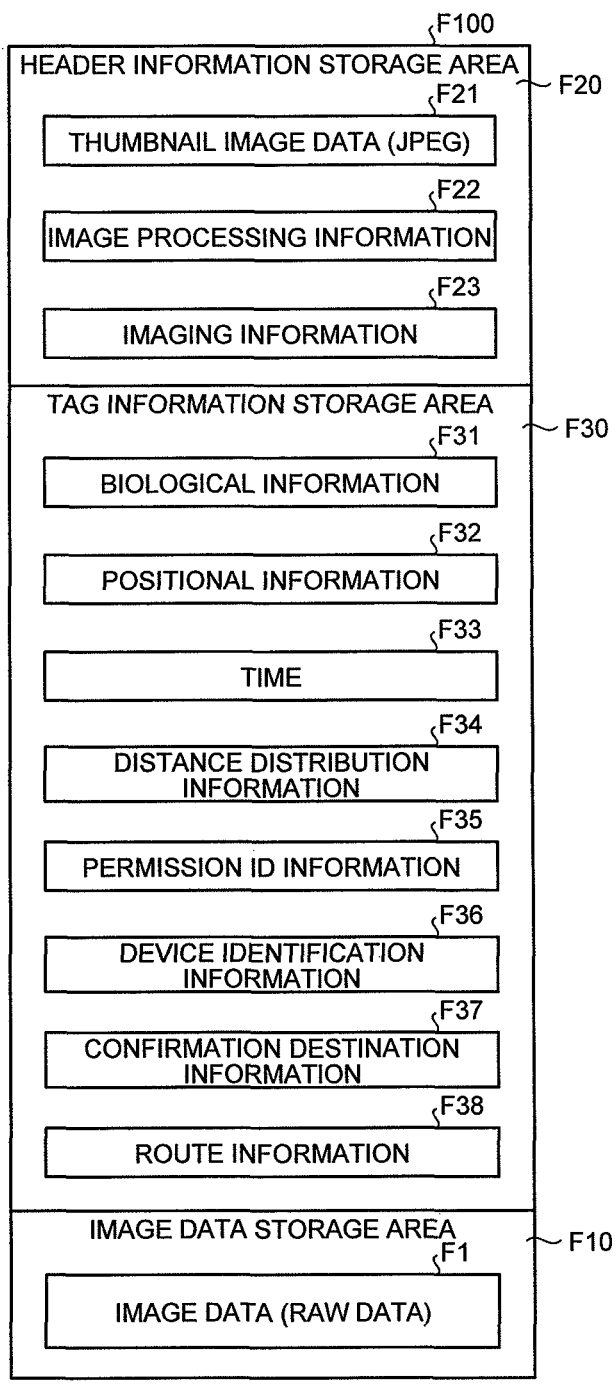
FIG. 5 is a diagram illustrating an exemplary configuration of an image file recorded on an image data recording unit of the imaging device according to some embodiments.

The image file F100 recorded in the image data recording unit 108b is described in detail herein with respect to FIG. 5, which is an exemplary configuration of the image file F100.

The image file F100 illustrated in FIG. 5 preferably includes an image data storage area F10 that stores image data F1, a header information storage area F20 that stores header information according to a format conforming to Exif (Exchangeable image file format), and a tag information storage area F30 that stores tag information used for personal authentication when an image file is transmitted to the outside via the network N.

The header information storage area F20 preferably records (stores) thumbnail image data F21 (JPEG format), image processing information F22 that records an image processing parameter used when image data is developed by the image processing unit 110a, and imaging information F23 in which a focal distance, an aperture value, an exposure value, ISO sensitivity, white balance, shutter speed, and the like are used when image data is imaged are recorded.

The tag information storage area F30 preferably stores or records biological information F31 detected by the biological information detector 107, positional information F32 acquired by the position acquiring unit 102, a time F33 input from the clock 106, distance distribution information F34 indicating the distribution of distances from the imaging device 100 to the subject in a specified row of pixels of an image corresponding to image data, permission ID information F35 indicating presence or absence of permission of portrait rights of a subject in an image, device identification information F36 indicating identification information of the imaging device 100, confirmation destination information F37 of the mobile device 500 of the owner of the imaging device 100, and route information F38 of transmission route of an image file including at least some of a plurality of servers. As described above, it is often convenient to provide a lot of tag information to the photographer, user, his/her family or friends, or other persons having access to the image. However, as the amount of information increases, privacy issues may arise, and particularly, for an image uploaded to a network accessible by a large indefinite number of viewers, a person who infringes a right innocently or with malicious intent may utilize the information in a way different from a right holder's intention. The imaging device 100 according to some embodiments herein deletes or removes the tag information (particularly, an item capable of tracking an individual's activity such as when, where, and who) depending on a situation prior to transmitting the resultant data.

Referring again to FIGS. 2-4, the communication unit 109 preferably performs wireless communication with any one of the image reception server 200, the management server 300, the image display server 400, and the mobile device 500 according to a specified wireless communication standard, and transmits an image file or content data to any one of the image reception server 200, the management server 300, the image display server 400, and another mobile device 500. Examples of the specified wireless communication standard include, without limitation, IEEE802.11b and IEEE802.11n. In some embodiments herein, any wireless communication standard can be applied. The communication unit 109 preferably receives content data, error information, an IP address, and a password (key information) from any one of the management server 300, the image display server 400, and the mobile device 500. The error information is information indicating that confirmation destination information transmitted from the management server 300 through the image reception server 200 (described herein) is not added when the confirmation destination information is not recorded in the tag information of an image file when the image file is transmitted. The communication unit 109 transmits an image file including at least route information including among pieces of tag information of an image file to be transmitted to any one of a plurality of servers according to route information.

The communication unit 109 is preferably configured using a communication device that performs wireless communication with any one of the management server 300, the image display server 400, and the mobile device 500 via the network N and performs two-way communication of an image file, content data, or various kinds of information. The communication device is preferably configured using an antenna that transceives a radio signal with another device, a transceiving circuit that performs a demodulation process of demodulating a received signal and a modulation process of modulating a signal to be transmitted, and the like.

When the imaging device 100 is activated, the communication unit 109 periodically transmits a communication signal with identification information (device ID) for notifying of the presence thereof. The communication unit 109 receives a communication signal transmitted from any one of the management server 300, the image display server 400 and the mobile device 500, returns from a stopped status or a standby status, and establishes communication with any one of the management server 300, the image display server 400, and the mobile device 500. The communication unit 109 returns from the stopped status or the standby status when entering the mode of the imaging device 100, such as, for example, the playback mode or the communication mode. The communication unit 109 may be incorporated into a recording medium such as a memory card mounted from the outside of the imaging device 100. The communication unit 109 may also be installed as an accessory mounted in the imaging device 100 through a hot shoe.

The control unit 110 transfers a corresponding instruction or data to the components configuring the imaging device 100, for example, according to an instruction signal input from the input unit 103 or the positional signal input from the touch panel 105, and controls an operation of the imaging device 100 in general. The control unit 110 is configured using a CPU (Central Processing Unit) or the like.

A detailed configuration of the control unit 110 will be described. The control unit 110 preferably includes the image processing unit 110a, a face detector 110b, a distance distribution detector 110c, a tag information adding unit 110d, a tag information deleting unit 110e, a display controller 110f, a candidate determining unit 110g, a shooting condition tag information determining unit 110h, and a communication determining unit 110i.

The image processing unit 110a acquires the image data generated by the imaging unit 101 or image data (raw data) recorded in the recording unit 108, and generates image data (processed image data) obtained by executing various kinds of image processing on the acquired image data. The image data is output to the recording unit 108 through the control unit 110. The image processing unit 110a is configured using an image engine.

The face detector 110b preferably detects a face of a person included in an image corresponding to image data by pattern matching. More particularly, the face detector 110b detects the position of the face, the size of the face, a direction of the face, an angle (inclination) of the face, and the like by detecting the position of the face in an image by pattern matching and then detecting the positions of features of the face such as the eyes, the ears, and the mouth. When the face in the image is detected, the face detector 110b detects the eyes, the ears, the mouth, and the size of the face as feature points of the face. The face detector 110b may detect a face of an animal or the like as well as a face of a person. In addition, the face detector 110b may detect a face of a person using a known technique other than pattern matching.

The distance distribution detector 110c detects distance distribution information indicating the distribution of distances from the imaging device 100 to the subject when a specified row of pixels in an image corresponding to image data is used as a reference. More particularly, the distance distribution detector 110c detects the distance of each of a plurality of focus points, and detects distance distribution information from the imaging device 100 to the subject. Here, the distance distribution information may be information obtained when the imaging device 100 is brought into focus, focus positional information, or relative comparative information. The distance distribution detector 110c does not have to perform accurate measurement and may only provide information about a near-far relation. Alternatively, the distance distribution detector 110c may only provide information about a landscape and a close range, and may determine and detect even a landscape in a poster or the like as a short distance as opposed to a long distance. Further, for focusing, a hill-climbing method, a phase difference method, and the like are generally used, but face size information or blur information can also be used.

The tag information adding unit 110d adds tag information to an image file. The tag information preferably includes route information for transmitting the image file to at least one of a plurality of servers. More particularly, the tag information adding unit 110d generates the biological information F31, the positional information F32, the time F33, the distance distribution information F34, the permission ID information F35, the device identification information F36, the confirmation destination information F37, and the route information F38 in the tag information storage region F30 recorded in the image file F100, and adds the information to the image file as the tag information.

When the communication unit 109 transmits the image file to any one of a plurality of servers, the tag information deleting unit 110e preferably deletes, blocks, or removes the tag information other than route information based on the route information of the tag information of the image file. Preferably, the tag information deleting unit 110e deletes the biological information F31, the positional information F32, the time F33, the distance distribution information F34, the permission ID information F35, the device identification information F36, and the confirmation destination information F37 which are recorded in the tag information storage area F30 in the image file F100. Alternatively, the tag information deleting unit 110e can delete only tag information specified by an individual such as the biological information F31, the positional information F32, the permission ID information F35, and the confirmation destination information F37. For an image uploaded to a network accessible by a large indefinite number of viewers, a person who infringes a right innocently or with malicious intent may utilize the information in a way different from a right holder's intentions, and thus, it is safer to delete or remove the tag information (particularly, an item capable of tracking an individual's activity such as when, where, and who) depending on a situation prior to transmitting the resultant data. In most cases, it is better to delete, block, or remove all information related to a subject or location.

The display controller 110f controls a display form of the display unit 104. The display controller 110f causes various kinds of information of the imaging device 100 to be displayed on the display unit 104.

The candidate determining unit 110g determines whether or not a face detected in an image by the face detector 110b is a specific face. More particularly, the candidate determining unit 110g determines whether or not a feature point of a face detected by the face detector 110b matches a feature point of a face of a person, such as a family member or other person known to an owner of the imaging device 100, or a feature point of a pet which is registered in advance.

The shooting condition tag information determining unit 110h decides whether the image display server 400 performs an image display using a first route (a route 1) or a second route (a route 2) as a transmission route of an image file, and decides shooting tag information at the time of shooting which is added to the image file by the tag information adding unit 110d. Here, the shooting tag information at the time of shooting refers to the biological information F31, the positional information F32, the time F33, the distance distribution information F34, the permission ID information F35, and the device identification information F36.

The communication determining unit 110i decides which of the first route, for example, route 1 or route 2, is used to transmit the image file to the image display server 400 as the transmission route of the image file according to the shooting tag information attached to the image file. For example, when the shooting tag information attached to the image file is the distance distribution information F34, the communication determining unit 110i decides that the image file is to be transmitted to the image display server 400 through the first route which will be described later, and adds the image file using the decision as the route information.

Figure 6:
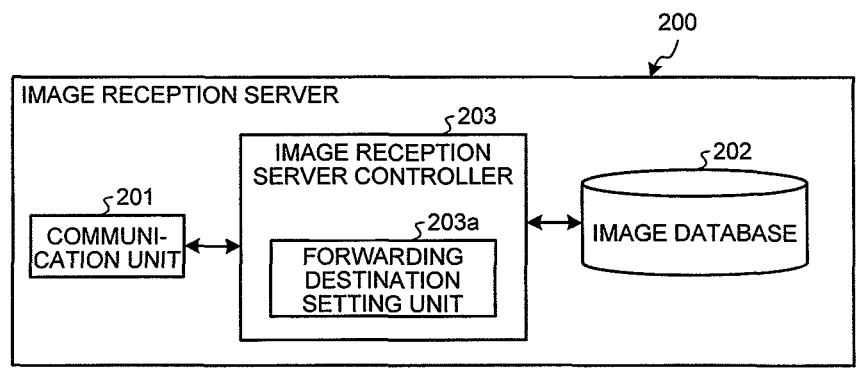
FIG. 6 is a block diagram illustrating a functional configuration of an image reception server according some embodiments.

Next, a configuration of the image reception server 200 will be described with reference to FIG. 6, which is a block diagram illustrating a functional configuration of the image reception server 200. The image reception server 200 illustrated in FIG. 6 preferably includes a communication unit 201, an image database 202, and an image reception server controller 203.

The communication unit 201 preferably communicates with any one of the imaging device 100, the management server 300, the image display server 400, and the mobile device 500 via the network N, and transmits an image file or content data to any one of the imaging device 100, the management server 300, the image display server 400, and the mobile device 500. The communication unit 201 also preferably communicates with any one of the imaging device 100, the management server 300, the image display server 400, and the mobile device 500, and receives image file request data, an IP address, account data (key information), and the like.

The image database 202 preferably records the image file and the content data received from any one of the imaging device 100, the management server 300, the image display server 400, and the mobile device 500 through the network N, the communication unit 201, and the image reception server controller 203. The image database 202 is preferably configured using a recording medium such as SDRAM or a hard disc recorder.

The image reception server controller 203 is preferably configured using a CPU, and transmits the image file or the content data recorded in the image database 202 in response to an access signal input from any one of the imaging device 100, the management server 300, the image display server 400, and the mobile device 500 through the network N and the communication unit 201. The image reception server controller 203 preferably includes a forwarding destination setting unit 203a.

The forwarding destination setting unit 203a transmits the image file F100 to a server of a transmission destination based on the route information F38 of the tag information storage region F30 in the image file F100 received from the imaging device 100 through the network N and the communication unit 201. For example, when the route information F38 recorded in the image file F100 received from the imaging device 100 represents "the route 1," the forwarding destination setting unit 203a transmits the image file F100 to the image display server 400, and when the route information F38 represents "the route 2," the forwarding destination setting unit 203a transmits the image file F100 to the management server 300.

Next, a configuration of the management server 300 will be described with reference to FIG. 7, which is a block diagram illustrating a functional configuration of the management server 300. The management server 300 illustrated in FIG. 7 preferably includes a communication unit 301, a user database 302, an image database 303, and a management server controller 304.

The communication unit 301 preferably communicates with any one of the imaging device 100, the image reception server 200, the image display server 400, and the mobile device 500 according to a specified communication standard, and receives an image file or content data. The communication unit 301 preferably transmits the tag information serving as confirmation information to the mobile device 500 based on confirmation destination information of the mobile device 500 serving as an external device associated with the imaging device 100 among pieces of information included in the tag information of the image file received through the network N. The communication unit 301 also transmits an image file including digital watermark information to any one of the imaging device 100, the image reception server 200, the image display server 400, and the mobile device 500 based on the route information of the transmission route of the image file that is included in the tag information of the image file and passes through the management server 300. In some embodiments, the communication unit 301 functions as a server communication unit.

The user database 302 records personal authentication information which is preferably recorded in advance. More particularly, the user database 302 records owner information of the owner/operator of the imaging device 100, biological information of the owner/operator of the imaging device 100, portrait right information of the portrait right holder, biological information of the portrait right holder, and confirmation destination information including, for example and without limitation, a mail address or a telephone number of the mobile device 500 of the device owner/operator or the portrait right holder. The user database 302 is configured using a recording medium such as SDRAM or a hard disc recorder.

The image database 303 records a received image file. The image database 303 preferably includes a reception image data recording unit 303a and a transmission image data recording unit 303b.

The reception image data recording unit 303a records an image file received from the image reception server 200. More particularly, the reception image data recording unit 303a records an image file at the time of transmission which is transmitted from the imaging device 100 through the network N and the image reception server 200.

The transmission image data recording unit 303b preferably records a transmission image file in which tag information used for personal authentication by the management server controller 304 (described hereafter) is added to an image file as digital watermark information. For digital watermarking of tag information, tag information may be included as digital watermark information. In addition information associated with tag information or information obtained by encrypting tag information may be included as digital watermark information. As a digital watermark technique, it is preferable that the above-mentioned information be converted into a form of a text code, a number, or an identifier and embedded in a spatial domain, a frequency domain, or the like. A specific bit of a pixel value having specific color information can be embedded, or a spread spectrum technique, a patchwork technique, or the like can be appropriately used. Watermark information for falsification prevention may be attached using the digital watermark technique.

The transmission image file recorded in the transmission image data recording unit 303b will be described with reference to FIG. 8 which is a diagram illustrating an exemplary configuration of a transmission image file.

Figure 8:
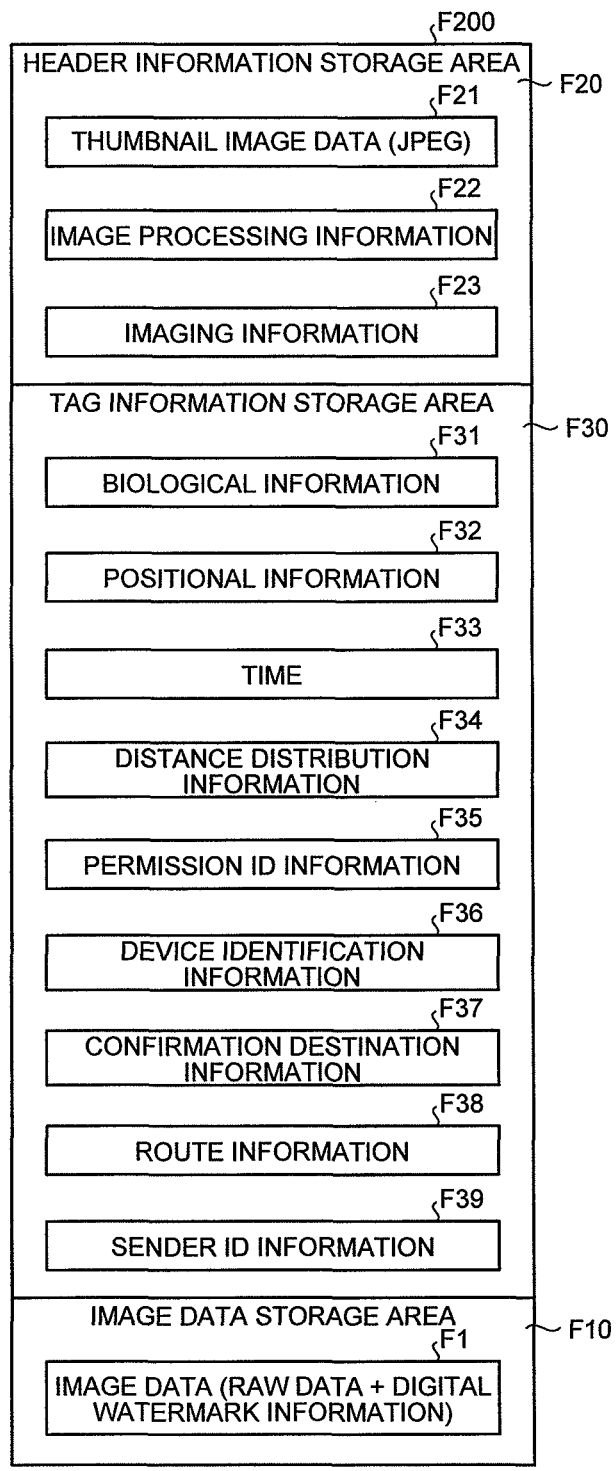
FIG. 8 is a diagram illustrating an exemplary configuration of a transmission image file recorded on a transmission image data recording unit of the management server according to some embodiments.

A transmission image file F200 illustrated in FIG. 8 preferably includes an image data storage area F10 that stores image data F1, a header information storage area F20 that stores header information, and a tag information storage area F30 that stores tag information used for personal authentication when the image file is transmitted to the outside through the network N.

The header information storage area F20 preferably records (stores) the thumbnail image data F21, the image processing information F22, and the imaging information F23 according to a format confirming to Exif.

The tag information storage area F30 preferably stores (records) biological information F31, positional information F32, a time F33, distance distribution information F34, permission ID information F35, device identification information F36, confirmation destination information F37, route information F38, and sender ID information F39 identifying a sender that has transmitted the image file.

Figure 7:
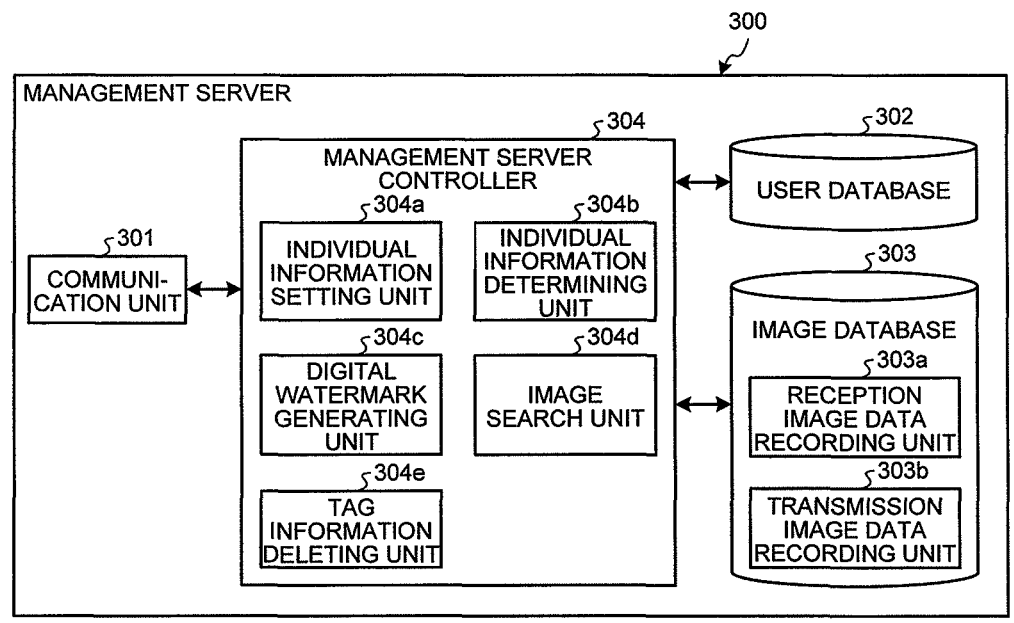
FIG. 7 is a block diagram illustrating a functional configuration of a management server according to some embodiments.

Referring to FIG. 7, the management server controller 304 is configured using a CPU or the like, and transmits the transmission image file recorded in the image database 303 in response to an access signal input from any one of the imaging device 100, the image reception server 200, the image display server 400, and the mobile device 500 through the network N and the communication unit 301. The management server controller 304 preferably includes an individual information setting unit 304a, an individual information determining unit 304b, a digital watermark generating unit 304c, an image search unit 304d, and a tag information deleting unit 304e.

The individual information setting unit 304a preferably records the tag information included in the image file received through the network N and the communication unit 301 in a user database.

The individual information determining unit 304b preferably determines whether or not selection information selecting the tag information received from the mobile device 500 through the network N matches the tag information for personal authentication included in the received image file. The individual information determining unit 304b also preferably determines whether or not the tag information included in the image file received through the network N and the communication unit 301 matches the personal authentication information including the owner information, the biological information of the owner of the imaging device 100, the portrait right information of the portrait right holder, and the portrait right information of the portrait right holder which is recorded in the user database 302.

When it is determined that the selection information received from the mobile device 500 by the individual information determining unit 304b matches the tag information included in the received image file, the digital watermark generating unit 304c adds the tag information corresponding to the selection information to the image data as digital watermark information.

The image search unit 304d preferably searches for a similar image present on the network N using a model image received from the mobile device 500 through the network N, and transmits a deletion instruction signal for deleting the similar image to a server that manages the similar image when there is the searched similar image.

The tag information deleting unit 304e preferably deletes, blocks, or removes the tag information of the image file when the communication unit 301 transmits the image file. More particularly, the tag information deleting unit 304e deletes or removes the biological information F31, the positional information F32, the permission ID information F35, the device identification information F36, the confirmation destination information F37, and the sender ID information F39 from the tag information storage area F30 of the transmission image file F200. Further, the tag information deleting unit 304e may delete or remove only the tag information added to the image data as digital watermark information by the digital watermark generating unit 304c from the tag information storage area F30 of the transmission image file F200.

Figure 9:
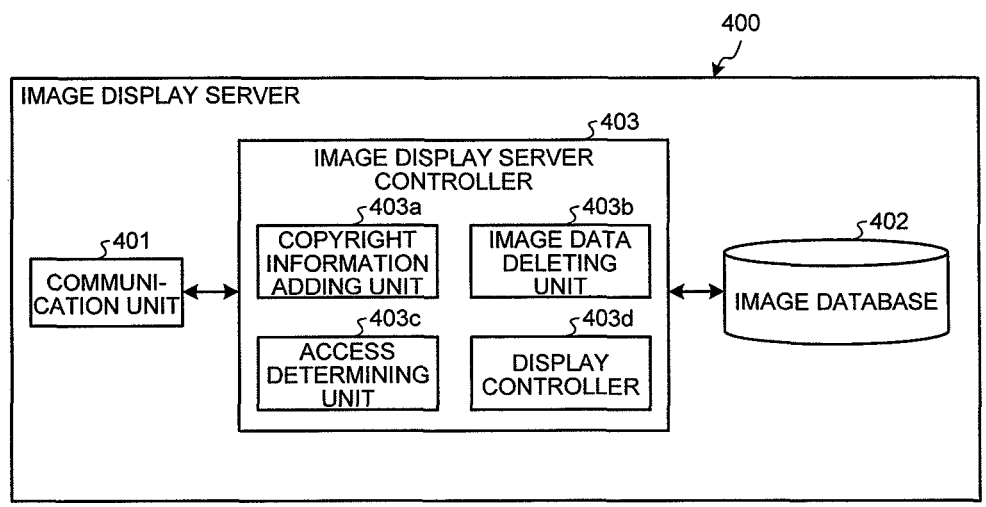
FIG. 9 is a block diagram illustrating a functional configuration of an image display server according to some embodiments.

The image display server 400 will be described with reference to FIG. 9 which is a block diagram illustrating a functional configuration of the image display server 400. The image display server 400 illustrated in FIG. 9 preferably includes a communication unit 401, an image database 402, and an image display server controller 403.

The communication unit 401 preferably communicates with any one of the imaging device 100, the image reception server 200, the management server 300, and the mobile device 500 according to a specified communication standard, and receives an image file or content data. In addition, the communication unit 401 preferably transmits an image file or content data to any one of the imaging device 100, the image reception server 200, the management server 300, and the mobile device 500 through the network N.

The image database 402 preferably records an image file received from the image reception server 200 or the management server 300 through the network N and the communication unit 401. The image database 402 is configured using a recording medium such as an SDRAM or a hard disc recorder.

The image display server controller 403 is preferably configured using a CPU or the like, and transmits a designation page (image file) of a browser in response to an access signal input from any one of the imaging device 100, the image reception server 200, the management server 300, and the mobile device 500 through the network N and the communication unit 401.

The image display server controller 403 preferably includes a copyright information adding unit 403a, an image data deleting unit 403b, an access determining unit 403c, and a display controller 403d.

When copyright information is included in the image file received from the management server 300 through the network N and the communication unit 401, the copyright information adding unit 403a preferably adds prohibition information that prohibits the image database 402 from copying any copyrighted information.

The access determining unit 403c determines a device that has received an access signal through the network N and the communication unit 401. For example, the access determining unit 403c determines whether or not there has been access from the image reception server 200, the management server 300, or the mobile device 500.

Upon receiving a deletion signal indicating deletion of an image file from the management server 300 through the network N and the communication unit 401, the image data deleting unit 403b preferably deletes an image file represented by the deletion signal from the image database 402.

The display controller 403d preferably controls a display form of a designated designation page of a browser in response to an access signal input from any one of the imaging device 100, the image reception server 200, the management server 300, and the mobile device 500 through the network N and the communication unit 401. For example, the display controller 403d displays an image corresponding to image data of an image file of the designated designation page. In addition, when the prohibition information is included in the image file of the designation page, the display controller 403d causes information indicating copy prohibition to be displayed on an image in a superimposed manner.

The mobile device 500 will be described with reference to FIG. 10 which is a block diagram illustrating a functional configuration of the mobile device 500. When the owner of the mobile device 500 is the same as the owner of the imaging device 100, the owner of the mobile device 500 is assumed to have a right to know how his/her imaging device (camera) has been used. When an imaging device is a rental device or a borrowed device, there can be cases in which the device owner or lender does not give a right to know how the imaging device (camera) has been used to the renter or borrower, and a mobile device of the device owner or lender may be registered as the mobile device 500.

Figure 10:
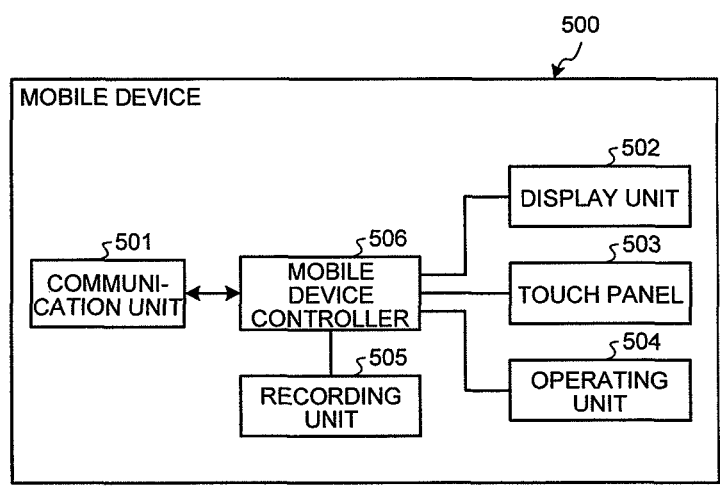
FIG. 10 is a block diagram illustrating a functional configuration of a mobile device according to some embodiments.

The mobile device 500 illustrated in FIG. 10 preferably includes a communication unit 501, a display unit 502, a touch panel 503, an operating unit 504, a recording unit 505, and a mobile device controller 506.

The communication unit 501 preferably communicates with any one of the imaging device 100, the image reception server 200, the management server 300, and the image display server 400 according to a specified communication standard, and receives an image file or content data. The communication unit 501 preferably transmits an image file or content data to anyone of the imaging device 100, the image reception server 200, the image display server 400, and the image display server 400 through the network N. In addition, the communication unit 501 can receive a list of pieces of tag information used for personal authentication from the management server 300.

The display unit 502 preferably displays an image corresponding to image data. The display unit 502 is preferably configured using a display panel such as a liquid crystal panel or an organic EL panel. The display unit 502 preferably displays a list of pieces of tag information received through the communication unit 501. More particularly, the display unit 502 displays owner information of the owner of the imaging device 100 associated with the mobile device 500, for example, mail address information or telephone number information of the mobile device 500, owner information of the imaging device 100, and portrait right information. Further, the display unit 502 displays an image of a designation page designated when access to the image display server controller 403 is made through the network N and the communication unit 501.

The touch panel 503 is preferably disposed on a display screen of the display unit 502. The touch panel 503 can detect the touch of a finger, a touch pen, or any other object from the outside, and outputs a positional signal according to the detected touch position to the mobile device controller 506. The touch panel 503 can also detect the position which the user touches based on information displayed on the display unit 502, and receives an input of an instruction signal instructing an operation to be performed by the mobile device 500 according to the detected touch position.

The operating unit 504 preferably receives an input of a selection signal for selecting various kinds of parameters of the mobile device 500 or the personal authentication information.

The recording unit 505 preferably records image data and various kinds of programs executed by the mobile device 500. The recording unit 505 is configured using a semiconductor memory such as, and without limitation, flash memory or DRAM.

The mobile device controller 506 is preferably configured using a CPU or the like, and transfers a corresponding instruction or data to the components configuring the mobile device 500 according to the positional signal or input from the touch panel 503 or an instruction signal input from the operating unit 504, and controls an operation of the mobile device 500 in general. The mobile device controller 506 preferably transmits tag information selected according to the positional signal input from the touch panel 503 to the management server 300 through the communication unit 501 and the network N. The user can make up for shooting tag information at the time of shooting based on the user's memory through the mobile device 500. For example, the user may convert tag information including such as tourist spot names in map information into information in which names of facilities in tourist spots are specified or information indicating a user specific relation, such as "grandma's house," using the mobile device 500. Similarly, even in date and time information, for example, an idea such as replacement by special information such as "birth day" or "wedding anniversary" may be introduced. As information individualization progresses as described above, the possibility of individual information leak increases, and the importance of encryption and digital watermark techniques increases.

The mobile device 600 has the same configuration as the mobile device 500, and the description of the configuration of the mobile device 600 is not repeated.

The image communication system 1 having the above configuration may have a copyright waiver mode in which the copyright of an image file including image data generated by the imaging device 100 is waived (copyright free) and a copyright protection mode in which the copyright is protected. The image communication system 1 or the imaging device 100 may change a transmission route of an image file by performing switching between the copyright waiver mode and the copyright protection mode.

The copyright waiver mode, in which the copyright of the image file generated by the imaging device 100 is waived, executed in the image communication system 1, will be described below with reference to FIG. 11 which is a diagram illustrating an outline of the copyright waiver mode executed by the image communication system 1.

Figure 11:
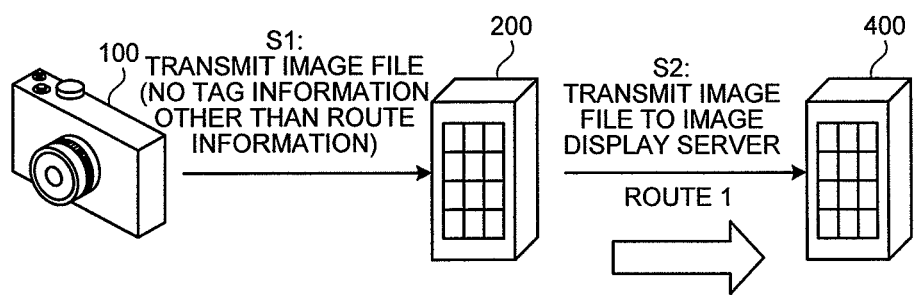
FIG. 11 is a diagram illustrating an outline of a copyright waiver mode executed by the image communication system according to some embodiments.

Referring to FIG. 11, the imaging device 100 detects tag information other than route information (the route 1) through the network N, and transmits an image file to the image display server 400 through the image reception server 200 (step S1) (the route 1).

The image reception server 200 that received the image file from the imaging device 100 transmits an image file according to the route information included in the image file to the image display server 400 (step S2). Thereafter, the image display server 400 causes the image file received from the image reception server 200 to be recorded in the image database 402. Through this operation, the user can access the image display server 400 using the mobile device 600, browse an image of a designation page, select the image, and then freely acquire and copy image data of the selected image through the mobile device 600 since the copyright of the image file is waived (copyright free). However, because there is a possibility that the image is an improperly posted image that infringes a copyright or other right, it would be difficult to correct a unilateral deletion measure.

As described above, in the copyright waiver mode of the image communication system 1, the image file in which the copyright is waived can be transmitted (posted) to the image display server 400 such that the tag information of the image file transmitted by the imaging device 100 is deleted and then transmitted to the image display server 400 through the image reception server 200. Because the imaging device 100 deletes the tag information before transmitting the image file to the image reception server 200, even when another user browses in the designation page of the image display server 400, personal information can be prevented from leaking.

The copyright protection mode, in which the copyright of the image file generated by the imaging device 100 is protected, executed by the image communication system 1 will be described with reference to FIG. 12 which is a diagram illustrating an outline of the copyright protection mode executed by the image communication system 1.

Figure 12:
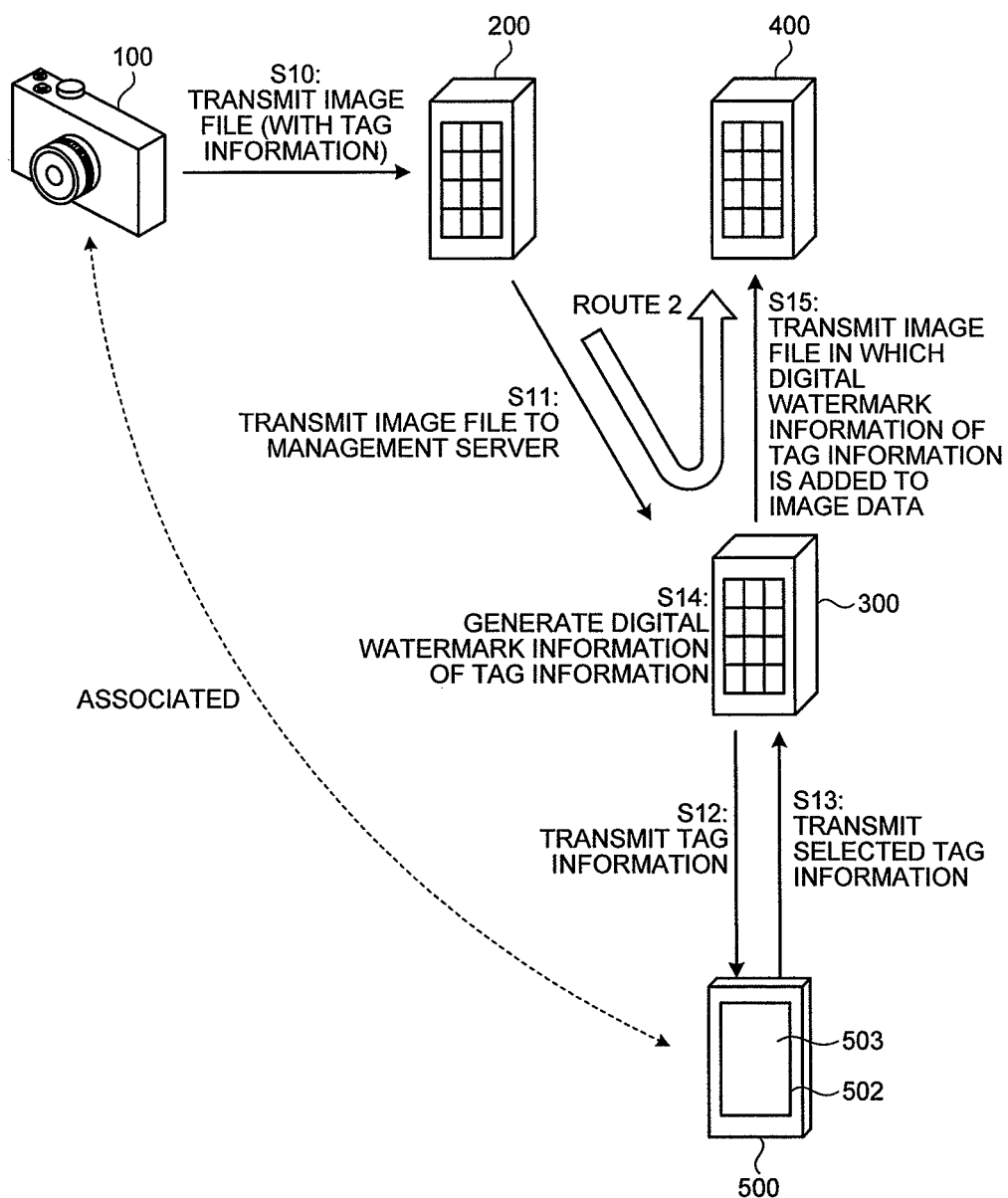
FIG. 12 is a diagram illustrating an outline of a copyright protection mode executed by the image communication system according to some embodiments.

As illustrated in FIG. 12, the imaging device 100 preferably transmits an image file including tag information to the image reception server 200 through the network N (step S10). The tag information includes the route information (the route 2) used to transmit the image file to the image display server 400 through the image reception server 200 and the management server 300 and confirmation destination information serving as transmission destination information of the mobile device 500 associated with the imaging device 100.

The image reception server 200 that has received the image file including the tag information transmits the image file to the management server 300 according to the route information of the tag information of the image file (step S11).

The management server 300 that has received the image file from the image reception server 200 preferably transmits a list of pieces of tag information used for personal authentication to the mobile device 500 corresponding to the confirmation destination information of the tag information as the confirmation information through a mail (step S12). For example, the management server 300 transmits at least one of owner information of the tag information, biological information, positional information, copyright information, and portrait right information to the mobile device 500 corresponding to address information of the tag information as confirmation information through a mail. Any information terminal with a communication function can be used as the mobile device.

The mobile device 500 that has received a list of pieces of tag information as confirmed information transmits tag information selected by the positional signal input from the touch panel 503 to the management server 300 (step S13). In this case, the mobile device 500 transmits one or more pieces of tag information to the management server 300.

The management server 300 that has received the tag information from the mobile device 500 preferably generates digital watermark information of the tag information selected by the mobile device 500, adds the digital watermark information to the image data, and deletes tag information corresponding to the digital watermark information from the image file (step S14).

The management server 300 then transmits the image file in which the digital watermark information of the tag information is added to the image data to the image display server 400 (step S15) (the route 2). Thereafter, the image display server 400 causes the image file received from the management server 300 to be recorded in the image database 402. As a result, it is difficult for the user to access the image display server 400 using the mobile device 600, browse an image of a designation page, select the image, and then acquire image data of the selected image through the mobile device 600 since copying is prohibited by the copyright of the image file.

As described above, in the copyright protection mode of the image communication system 1, the image file is transmitted to the image display server 400 through the image reception server 200, and the management server 300 according to the route information of the tag information of the image file transmitted by the imaging device 100. Thus, the image file can be transmitted to the image display server 400 in the state in which the copyright is protected.

Even when a user other than the owner of the imaging device 100, for example, an assistant of the owner, captures an image using the imaging device 100, the owner of the imaging device 100 can transmit the image file to the image display server 400 in the state in which the copyright of the image file is protected by selecting and approving the tag information used for the personal authentication.

The management server 300 preferably generates digital watermark information of the tag information selected by the mobile device 500 and transmits the image file in which the tag information including the digital watermark information is deleted to the image display server 400, and thus, even when another user browses in the designation page of the image display server 400, personal information can be prevented from leaking.

The transmission route of the image file may be switched by the above-described mode switching, and the shooting condition tag information determining unit 110*h* decides whether the image display server 400 performs an image display using the first route (the route 1 of FIG. 11) or the second route (the route 2 of FIG. 12) as a transmission route of an image file and decides shooting tag information at the time of shooting which is added to the image file, and the communication unit 109 may transmit the image file to the image display server 400 through any one of the first and second routes via the network N.

Alternatively, when an image file is generated, communication with the image display server 400 may be performed via the network N such that tag information to be attached to an image to be displayed on a network is decided in advance. In this case, the shooting condition tag information determining unit 110*h* may decide shooting tag information at the time of shooting which is to be attached to the image file, the communication determining unit 110*i* may decides which of the first route (for example, the route 1 of FIG. 11) and the second route (for example, the route 2 of FIG. 12) is used to transmit the image file to the image display server 400 as the transmission route of the image file according to the shooting tag information attached to the image file, and then the image file may be transmitted through the communication unit 109.

When shooting by the imaging device 100 is initiated, it is very difficult to specify a person who has operated the imaging device 100 to perform shooting. In this regard, in some embodiments, a photographer or user can be associated with the copyright in a one-to-one manner such that the imaging device 100 acquires information specifying a person (i.e., photographer) who has operated the imaging device 100 such as biological information or input information of a photographer who has operated the imaging device 100 at the time of shooting, and the acquired information is added as tag information of captured image data.

There are cases in which a person (subject or model) to be captured desires to tag, for example, waiver information of portrait rights to image data (captured image) at the time of shooting, and in this case, it is necessary to match a person who has waived the portrait rights with a person having the portrait rights. However, when the imaging device 100 acquires, for example, biological information including an image of a face of a person who has waived the portrait rights, in addition to determination as to whether or not the image data matches image data of the person who has waived the portrait rights, by using the biological information (for example, fingerprint information or vein information) of the person who has waived the portrait rights, so-called spoofing in which the portrait right waiver is made by a person other than the portrait right holder can be reliably prevented.

Because biological information specifying a photographer having the copyright or a subject having portrait rights is individual information, most photographers or subjects do not want individual information specifying an individual such as biological information published to the public. Therefore, an image file in which individual information, such as biological information, is tagged as tag information needs to be strictly managed.

As described above, special information that requires a photographer's careful handling such as individual information (biological information) specifying a subject is processed only in a specially authenticated server, and thus the information is secure (this relates to route information). However, because coordination with the mobile device 500 (external device) associated with the owner of the imaging device 100 is performed through a specific server (the management server 300), the security can be further improved (this also relates to route information).

As described above, confirmation of image publication to the Internet by the owner of the imaging device 100 or management of photographer or subject information can be properly performed according to a transmission route through which an image file is transmitted or processed. As a result, information or an image file generated by the imaging device 100 of some embodiments can be transmitted with a high rate of security.

Processes of each of the imaging device 100, the image reception server 200, the management server 300, and the image display server 400 described above will be described with reference to FIGS. 11 and 12.

First, a detail process executed by the imaging device 100 will be described with reference to FIG. 13 which is a flowchart illustrating a detailed process executed by the imaging device 100.

Figure 13:
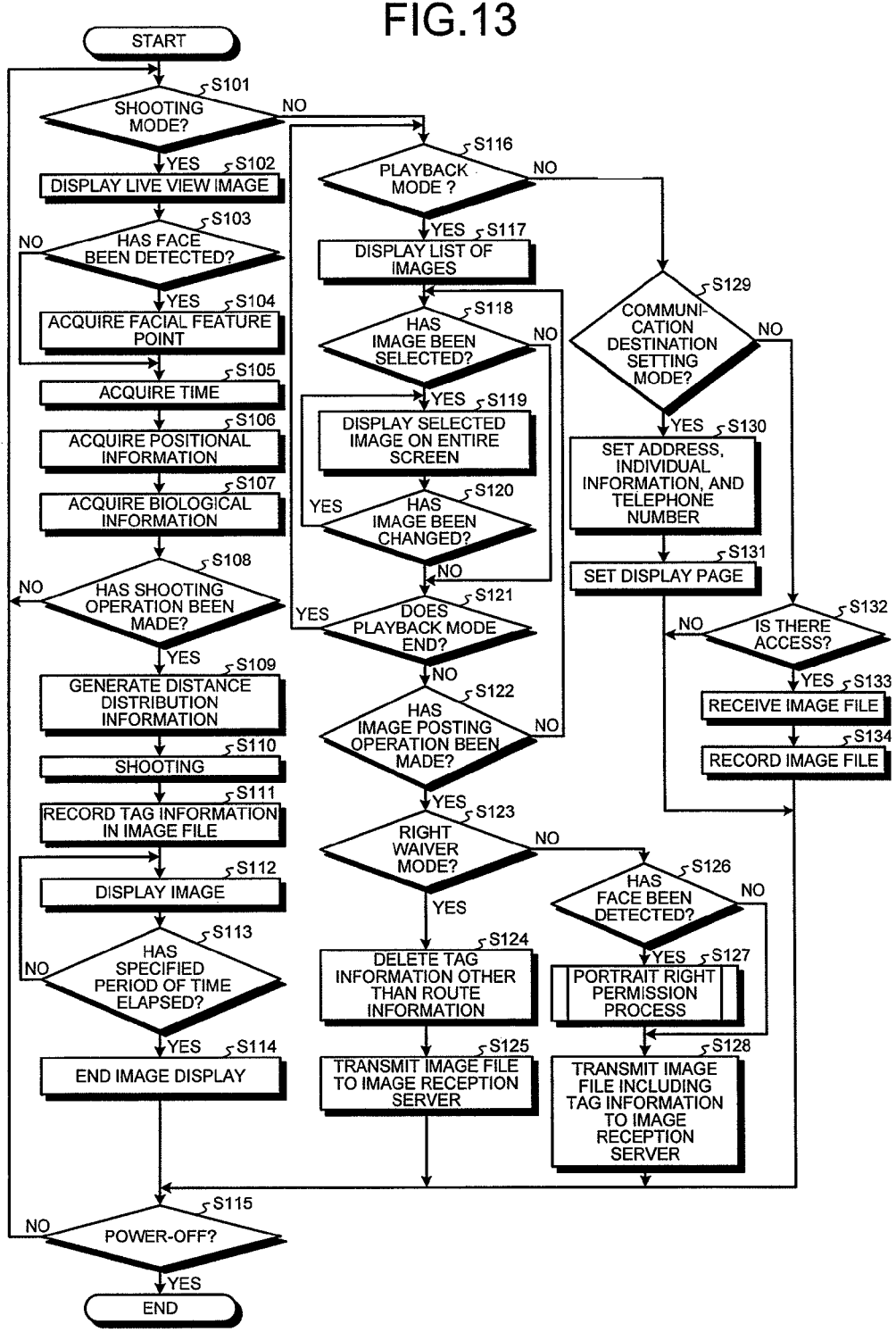
FIG. 13 is a flowchart of a detailed process executed by the imaging device according to some embodiments.
Figure 14:
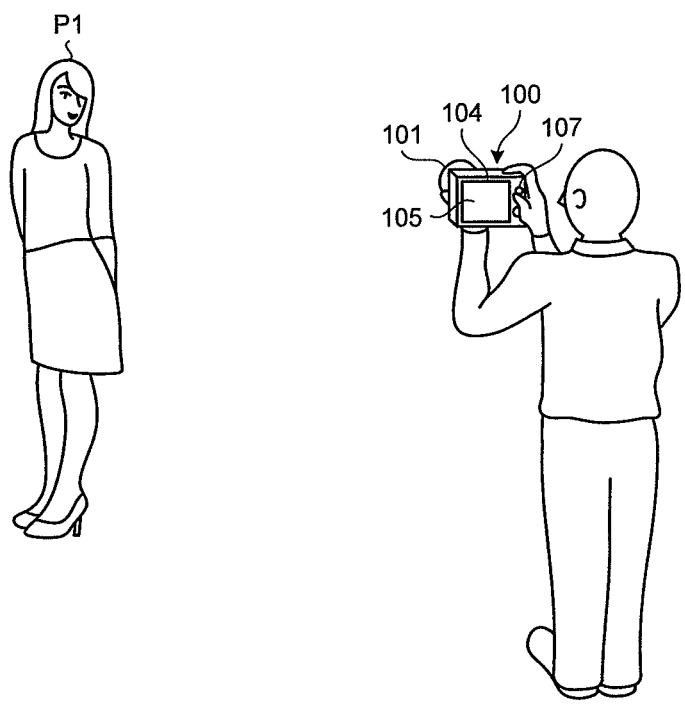
FIG. 14 is a perspective view of a user taking a picture of a subject using the imaging device according to some embodiments.
Figure 15:
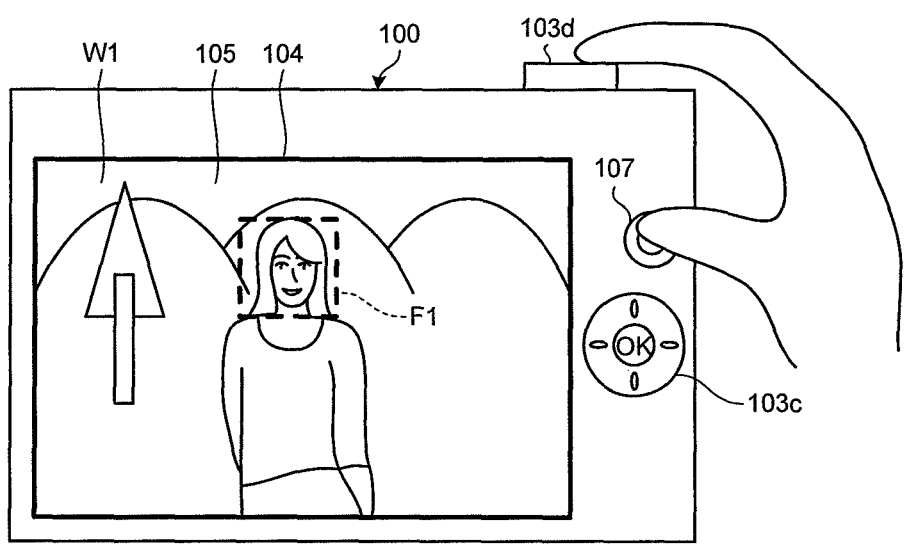
FIG. 15 illustrates an exemplary image displayed on a display unit of the imaging device according to some embodiments.

As illustrated in FIG. 13, when the imaging device 100 is set to a shooting mode (Yes in step S101), the control unit 110 preferably causes a live view image corresponding to image data generated by the imaging unit 101 to be displayed on the display unit 104 (step S102). As illustrated in FIGS. 14 and 15, a photographer or user K1 can check a live view image W1 displayed on the display unit 104 of the imaging device 100, and can perform shooting while adjusting composition on a shooting condition for a subject P1, for example, and without limitation, any one of an aperture value, an exposure value, ISO sensitivity, white balance, a focus position, a shutter speed, and a gradation through the operating switch 103c.

When the face detector 110b detects a face in the live view image W1 (Yes in step S103), the tag information adding unit 110d preferably acquires a feature point of the face detected by the face detector 110b (step S104). More particularly, when the face detector 110b detects the face in the live view image W1 as illustrated in FIG. 15, the tag information adding unit 110d acquires a feature point of the detected face. At this time, the display controller 110f causes a frame F1 corresponding to a facial area including the face detected by the face detector 110b to be superimposed on the live view image W1 and displayed on the display unit 104. After step S104, the imaging device 100 causes the process to proceed to step S105.

When it is determined in step S103 that the face detector 110b has not detected a face in the live view image W1 (No in step S103), the imaging device 100 causes the process to proceed to step S105.

The tag information adding unit 110d preferably acquires a time from the clock 106 at step S105, and acquires positional information from the position acquiring unit 102 at step S106.

The tag information adding unit 110d preferably acquires biological information of the photographer detected by the biological information detector 107 at step S107. More particularly, when the photographer touches the biological information detector 107 as illustrated in FIG. 15, the tag information adding unit 110d acquires the biological information of the photographer detected by the biological information detector 107. In this case, it is very important to specify the photographer at the moment of shooting in terms of copyright management because this information is likely to be closely connected with privacy and information requiring strict privacy protection. However, at this stage, it is difficult to strictly protect this information in a mobile device such as the imaging device 100, and it can be difficult to consistently install the latest version of this technique. In this regard, in some embodiments, individual information (privacy information) can be protected using an appropriate technique in an optimal environment at the time of transmission to the outside. The disclosed embodiments herein address the situation where the copyright is closely connected with individual information.

As the release switch 103b is operated to make a shooting operation (Yes in step S108), the distance distribution detector 110c detects distance distribution information indicating the distribution of distances from the imaging device 100 to the subject when a specified one line of the live view image W1 in the horizontal direction is used as a reference (step S109).

Figure 16:
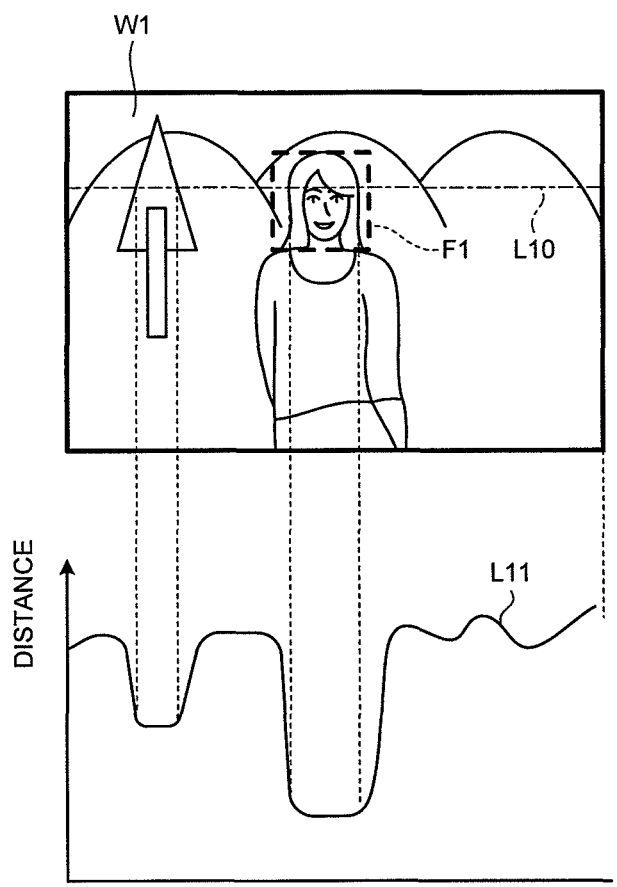
FIG. 16 is an explanatory diagram illustrating an outline of a distance detecting method performed by a distance distribution detector of the imaging device according to some embodiments.

FIG. 16 is an explanatory diagram illustrating an outline of a distance detecting method performed by the distance distribution detector 110c. In the lower portion of FIG. 16, a vertical axis represents the distance from the imaging device 100 to the subject, and a horizontal axis represents the position of each pixel in one line (a straight line L10) of an image.

As illustrated in FIG. 16, the distance distribution detector 110c preferably scans a specified one line of the live view image W1 in the horizontal direction, for example, one line (a row of pixels) including a frame F1 corresponding to a facial area detected by the face detector 110b, and detects the distance distribution from the imaging device 100 to the subject. More particularly, as illustrated in the upper portion of FIG. 16, the distance distribution detector 110c scans the line L10 on the live view image W1, and detects distance distribution information L11 (in the lower portion of FIG. 16) from the imaging device 100 to the subject.

Referring again to FIG. 13, in step S110, the control unit 110 preferably causes the imaging device 100 to perform shooting. More particularly, an operation of executing specified image processing on image data (raw data) output from the imaging unit 101 is performed as the imaging unit 101 is driven. As described above, image data that has been subjected to image processing is recorded in the recording unit 108.

The tag information adding unit 110d preferably records tag information in the image file in association with the image data at step S111.

The display controller 110f preferably causes the image corresponding to the captured image data to be displayed on the display unit 104 at step S112.

When a specified period of time, for example, 3 seconds elapses after the display unit 104 displays an image, (Yes in step S113), the imaging device 100 preferably causes the process to proceed to step S114. However, when the specified period of time does not elapse after the display unit 104 displays an image (No in step S113), the imaging device 100 preferably causes the process to return to step S112.

In step S114, the display controller 110f ends an image display by the display unit 104 (step S114).

When the imaging device 100 is in the power-off status (Yes in step S115), the imaging device 100 preferably ends the present process. However, when the imaging device 100 is not in the power-off status (No in step S115), the imaging device 100 preferably causes the process to return to step S101.

When it is determined in step S108 that the shooting operation has not been made (No in step S108), the imaging device 100 causes the process to return to step S101.

When it is determined in step S101 that the imaging device 100 is not set to the shooting mode (No in step S101) and the playback mode is set (Yes in step S116), the display controller 110f preferably causes a list of image data recorded in the image data recording unit 108b to be displayed on the display unit 104 (step S117).

When an image displayed on the display unit 104 is selected through the touch panel 105 or the input unit 103 (Yes in step S118), the display controller 110f preferably causes the selected image to be displayed on the entire screen of the display unit 104 (step S119).

When an image is changed by the touch panel 105 or the input unit 103 (Yes in step S120), the imaging device 100 preferably causes the process to return to step S119. However, when an image is not changed through the touch panel 105 or the input unit 103 (No in step S120), the imaging device 100 preferably causes the process to proceed to step S121.

When it is determined in step S118 that an image displayed on the display unit 104 is not selected through the touch panel 105 or the input unit 103 (No in step S118), the imaging device 100 preferably causes the process to proceed to step S121.

When the imaging device 100 ends the playback mode (Yes in step S121), the imaging device 100 preferably causes the process to return to step S116. However, when the imaging device 100 does not end the playback mode (No in step S121), the imaging device 100 causes the process to proceed to step S122.

When it is determined in step S122 that an image posting icon (not illustrated) receiving an input of an instruction signal for posting an image file of an image displayed on the display unit 104 to the image display server 400 has been operated (Yes in step S122), the imaging device 100 preferably causes the process to proceed to step S123 which will be described below. However, when an image posting icon receiving an input of an instruction signal for posting an image file of an image displayed on the display unit 104 to the image display server 400 has not been operated (No in step S122), the imaging device 100 preferably causes the process to return to step S118.

In step S123, the control unit 110 determines whether or not the imaging device 100 is set to the right waiver mode (step S123). More particularly, the control unit 110 determines whether or not an icon (not illustrated) receiving an input of an instruction signal for waiving the copyright for an image displayed on the display unit 104 has been operated through the touch panel 105. When the control unit 110 determines that the imaging device 100 is set to the right waiver mode (Yes in step S123), the imaging device 100 preferably causes the process to proceed to step S124 which will be described below. However, when the control unit 110 determines that the imaging device 100 is not set to the right waiver mode (No in step S123), the imaging device 100 preferably causes the process to proceed to step S126 which will be described below.

In step S124, the tag information deleting unit 110e preferably deletes or removes tag information excluding route information recorded in an image file to be transmitted. The tag information deleting unit 110e may change tag information to be deleted according to route information. For example, the tag information deleting unit 110e may selectively delete only biological information of tag information, positional information, and confirmation destination information.

Figure 17:
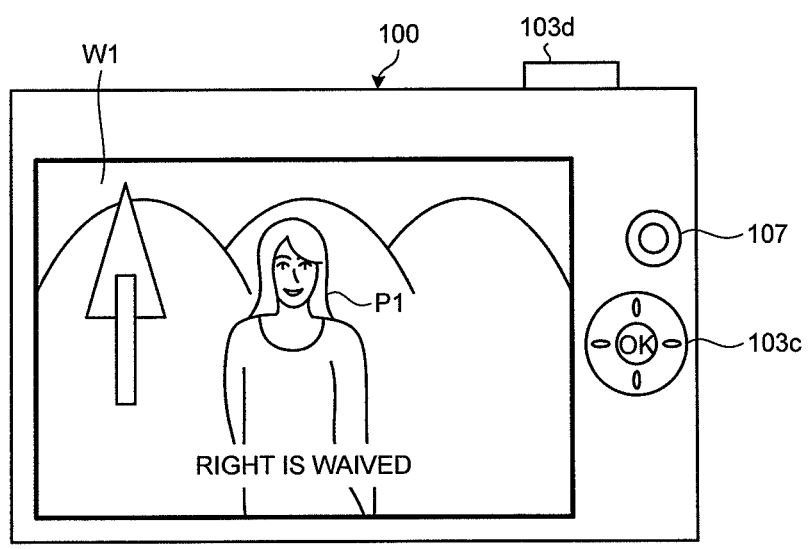
FIG. 17 illustrates an exemplary image displayed on the display unit of the imaging device according to some embodiments.

The communication unit 109 preferably transmits the image file in which the tag information excluding the route information is deleted or removed by the tag information deleting unit 110e to the image reception server 200 through the network N (step S125). In this case, as illustrated in FIG. 17, the display controller 110f may cause information (message) indicating that the copyright for an image W1 displayed on the display unit 104 is waived to be displayed on the display unit 104. Thus, the photographer can intuitively understand that the copyright of the captured image is waived. After step S125, the imaging device 100 causes the process to proceed to step S115.

In step S126, when the face detector 110b detects a face in the image (Yes in step S126), the imaging device 100 preferably executes a portrait right permission process of attaching presence/absence of portrait right permission to the face in the image (step S127).

Figure 18:
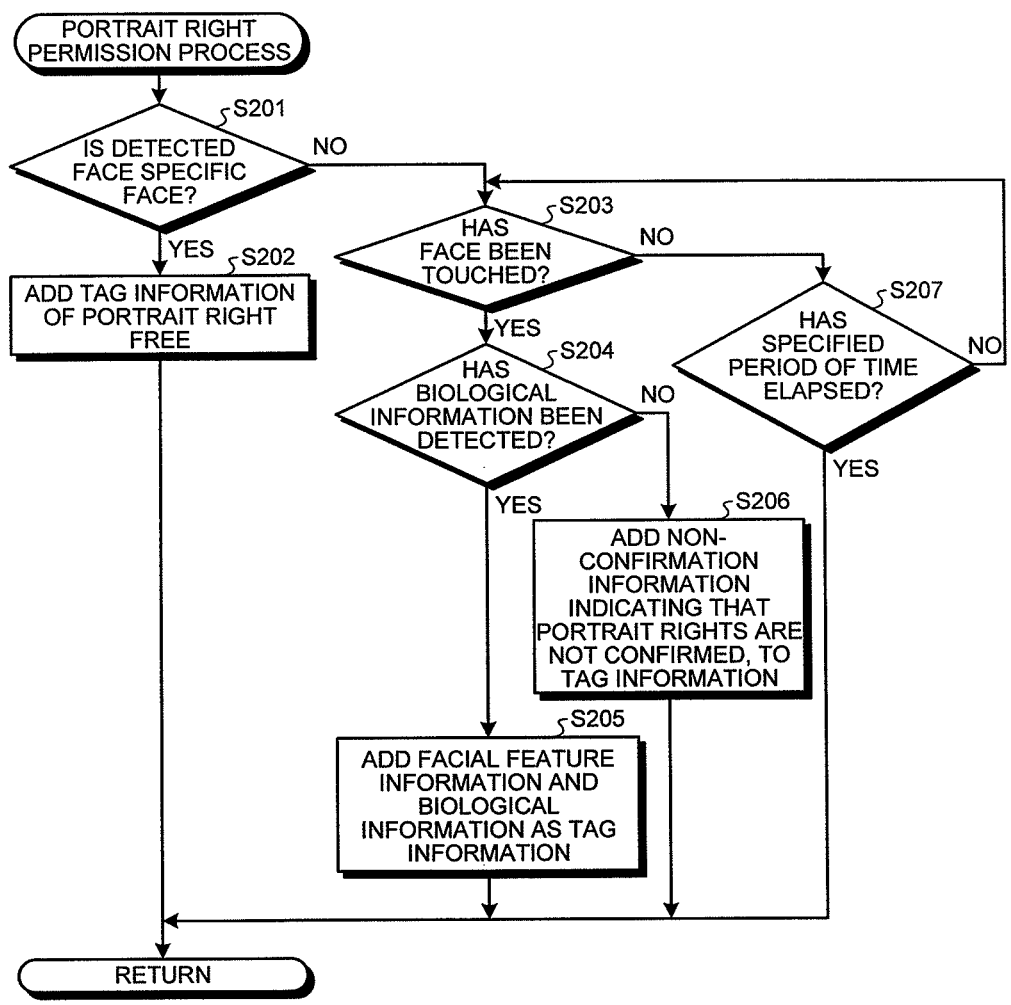
FIG. 18 is a flowchart illustrating an outline of a portrait right permission process shown in FIG. 13.

FIG. 18 is a flowchart illustrating an outline of the portrait right permission process of step S127 of FIG. 13. As illustrated in FIG. 18, the candidate determining unit 110g preferably determines whether or not the face detected in the image by the face detector 110b is a specific face (step S201). More particularly, the candidate determining unit 110g determines whether or not a feature point of a face detected by the face detector 110b matches a feature point of a face of a family member of the owner of the imaging device 100 or a feature point of a pet which is registered in advance. When the candidate determining unit 110g determines that the face detected in the image by the face detector 110b is the specific face (Yes in step S201), the imaging device 100 causes the process to proceed to step S202 which will be described below. However, when the candidate determining unit 110g determines that the face detected in the image by the face detector 110b is not the specific face (No in step S201), the imaging device 100 causes the process to proceed to step S203 which will be described below.

In step S202, the tag information adding unit 110d preferably adds tag information indicating that the face (subject) in the image is portrait right free (portrait right waived) to the tag information of the image file. After step S202, the imaging device 100 causes the process to return to the main or start routine of FIG. 13.

Figure 19:
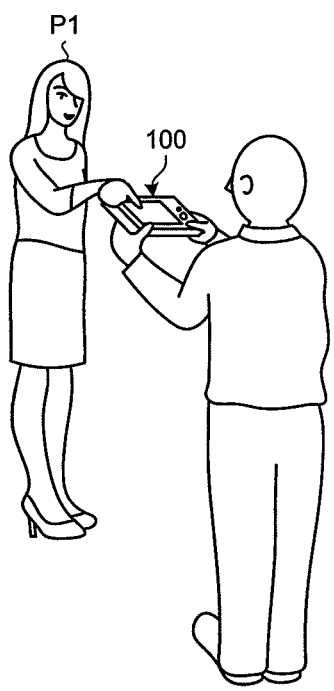
FIG. 19 is a perspective view of a subject permitting portrait rights.
Figure 20A:
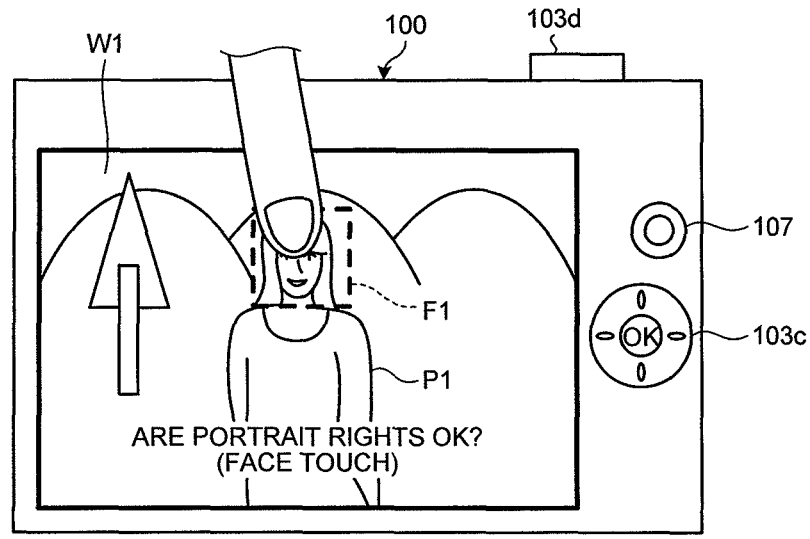
FIG. 20A is a perspective view of a subject permitting portrait rights using the imaging device according to some embodiments.
Figure 20B:
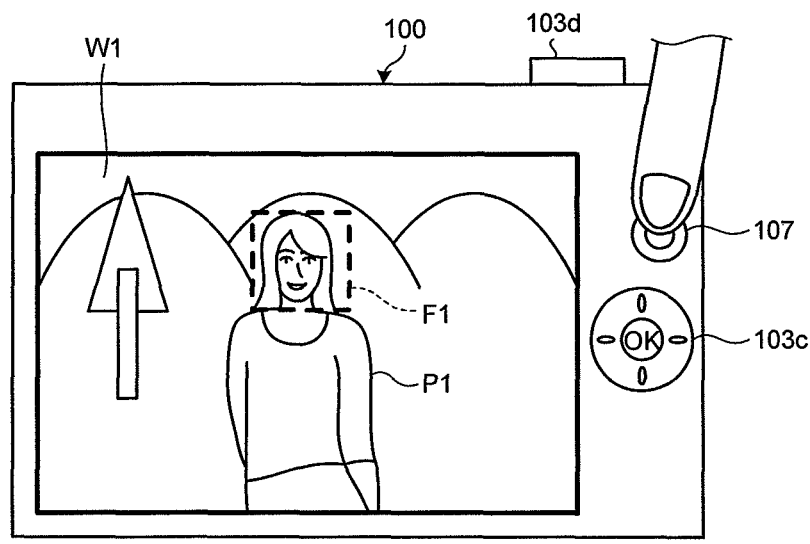
FIG. 20B is a perspective view of a subject permitting portrait rights using the imaging device according to some embodiments.

When it is determined in step S203 that the face in the image displayed on the display unit 104 is touched (Yes in step S203) and then the biological information detector 107 detects biological information (Yes in step S204), the tag information adding unit 110d preferably adds a feature point of the touched face in the image displayed on the display unit 104 and the biological information detected by the biological information detector 107 as the tag information (step S205). More particularly, when the subject P1 touches his/her facial area F1 on the image W1 displayed on the display unit 104 as illustrated in FIGS. 19 and 20A, the tag information adding unit 110d preferably adds a feature point of the facial area F1 of the touched face to tag information of a permission ID of portrait rights as the biological information. In addition when the subject P1 touches the biological information detector 107 as illustrated in FIG. 20B, the tag information adding unit 110d preferably adds the biological information detected by the biological information detector 107 as the tag information. After step S205, the imaging device 100 causes the process to return to the main or start routine of FIG. 13.

When it is determined in step S204 that the biological information detector 107 has not detected the biological information of the subject P1 (No in step S204), the tag information adding unit 110d preferably adds non-confirmation information indicating that the subject's portrait rights are not confirmed, to the tag information (step S206). After step S206, the imaging device 100 causes the process to return to the main or start routine of FIG. 13.

When it is determined in step S203 that the face in the image displayed on the display unit 104 is not touched (No in step S203) and a specified period of time, for example, 5 seconds elapses (Yes in step S207), the imaging device 100 preferably causes the process to return to the main or start routine of FIG. 13.

When it is determined in step S203 that the face in the image displayed on the display unit 104 is not touched (No in step S203) and the specified period of time does not elapse (No in step S207), the imaging device 100 preferably causes the process to return to step S203.

Returning to FIG. 13, step S128 and subsequent steps will be described. In step S128, the communication unit 109 preferably transmits the image file including the tag information to the image reception server 200. After step S128, the imaging device 100 causes the process to proceed to step S115.

When it is determined in step S101 that the imaging device 100 is not set to the shooting mode (No in step S101), the imaging device 100 is not set to the playback mode (No in step S116), and the imaging device 100 is set to a communication destination setting mode (Yes in step S129), the tag information adding unit 110d preferably causes personal information of the owner of the imaging device 100, such as, without limitation, a mail address of the mobile device 500 of the owner of the imaging device 100 and an owner name and a telephone number of the imaging device 100, to be recorded in the personal information recording unit 108d in response to an instruction signal input from the touch panel 105 or the input unit 103 (step S130).

The tag information adding unit 110d sets a designation page on which the image file is displayed through the image display server 400 at step S131. After step S131, the imaging device 100 causes the process to proceed to step S115.

When it is determined in step S129 that the imaging device 100 is not set to the communication destination setting mode (No in step S129) and there is access from another device via the network N (Yes in step S132), the imaging device 100 preferably receives an image file through the communication unit 109 at step S133, and causes the received image file to be recorded in the recording unit 108 at step S134. After step S134, the imaging device 100 causes the process to proceed to step S115.

When it is determined in step S132 that there is no access from another device via the network N (No in step S132), the imaging device 100 causes the process to proceed to step S115.

Figure 21:
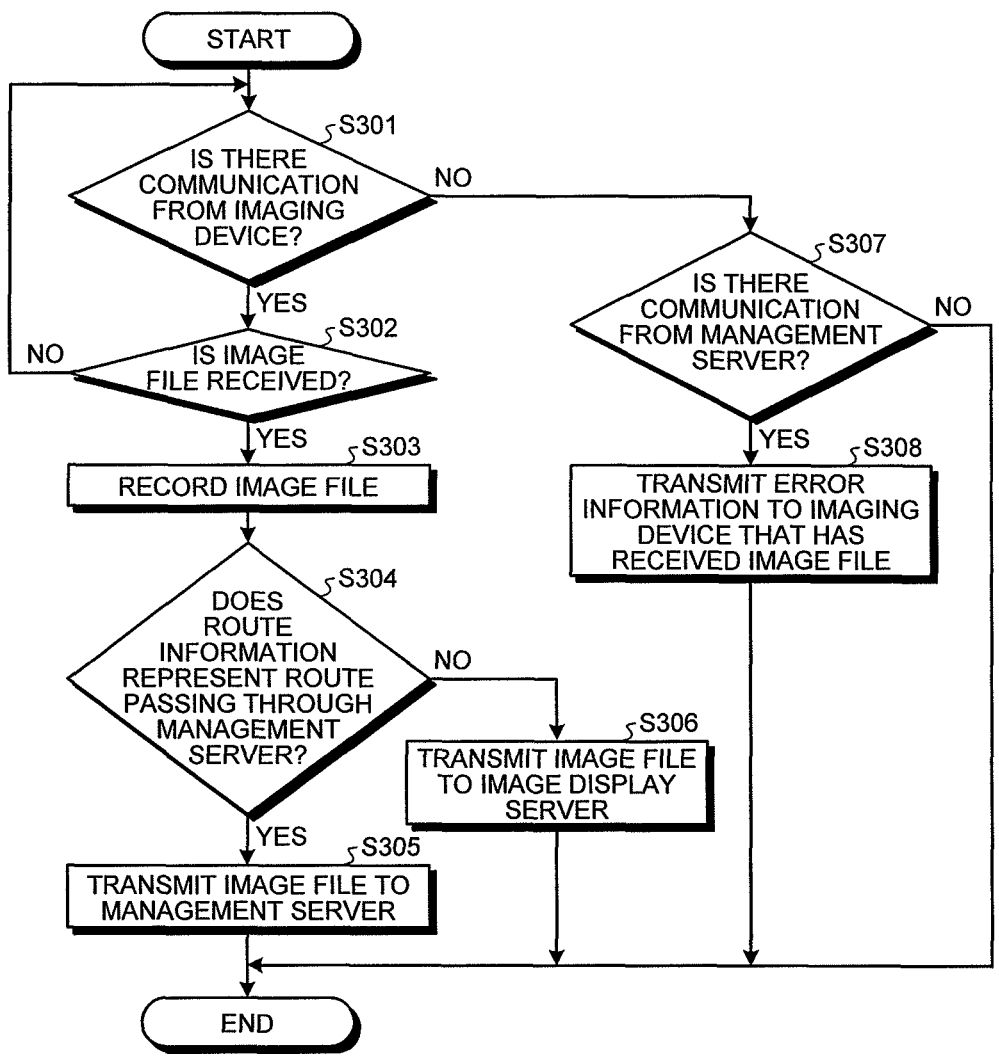
FIG. 21 is a flowchart illustrating a detailed process executed by the image reception server according to some embodiments.

A detailed process executed by the image reception server 200 will be described with reference to FIG. 21 which is a flowchart of a process executed by the image reception server 200. As illustrated in FIG. 21, when there is communication from the imaging device 100 via the network N (Yes in step S301) and an image file is received from the imaging device 100 (Yes in step S302), the image reception server controller 203 preferably causes the received image file to be recorded in the image database 202 (step S303).

When the route information added to the tag information of the image file represents a route passing through the management server 300 (Yes in step S304), the image reception server controller 203 preferably transmits the image file recorded in the image database 202 to the management server 300 through the network N and the communication unit 201 (step S305). After step S305, the image reception server 200 ends the present process.

When it is determined in step S304 that the route information added to the tag information of the image file does not represent a route passing through the management server 300 (No in step S304), the image reception server controller 203 preferably transmits the image file recorded in the image database 202 to the image display server 400 through the network N and the communication unit 201 at step S306. After step S306, the image reception server 200 ends the present process.

When it is determined in step S302 that no image file is received from the imaging device 100 (No in step S302), the image reception server controller 203 causes the process to return to step S301.

When it is determined in step S301 that there is no communication from the imaging device 100 via the network N (No in step S301) but there is communication from the management server 300 (Yes in step S307), the image reception server controller 203 preferably transmits error information indicating that the confirmation destination information of the mobile device 500 of the owner of the imaging device 100 is not added to the imaging device 100 that has received the image file (step S308). The photographer or user of the imaging device 100 can prevent the tag information from not being set in advance when the image file is transmitted to the image reception server 200. After step S308, the image reception server 200 ends the present process.

When it is determined in step S307 that there is no communication from the imaging device 100 via the network N (No in step S301) and there is no communication from the management server 300 (No in step S307), the image reception server 200 ends the present process.

Figure 22:
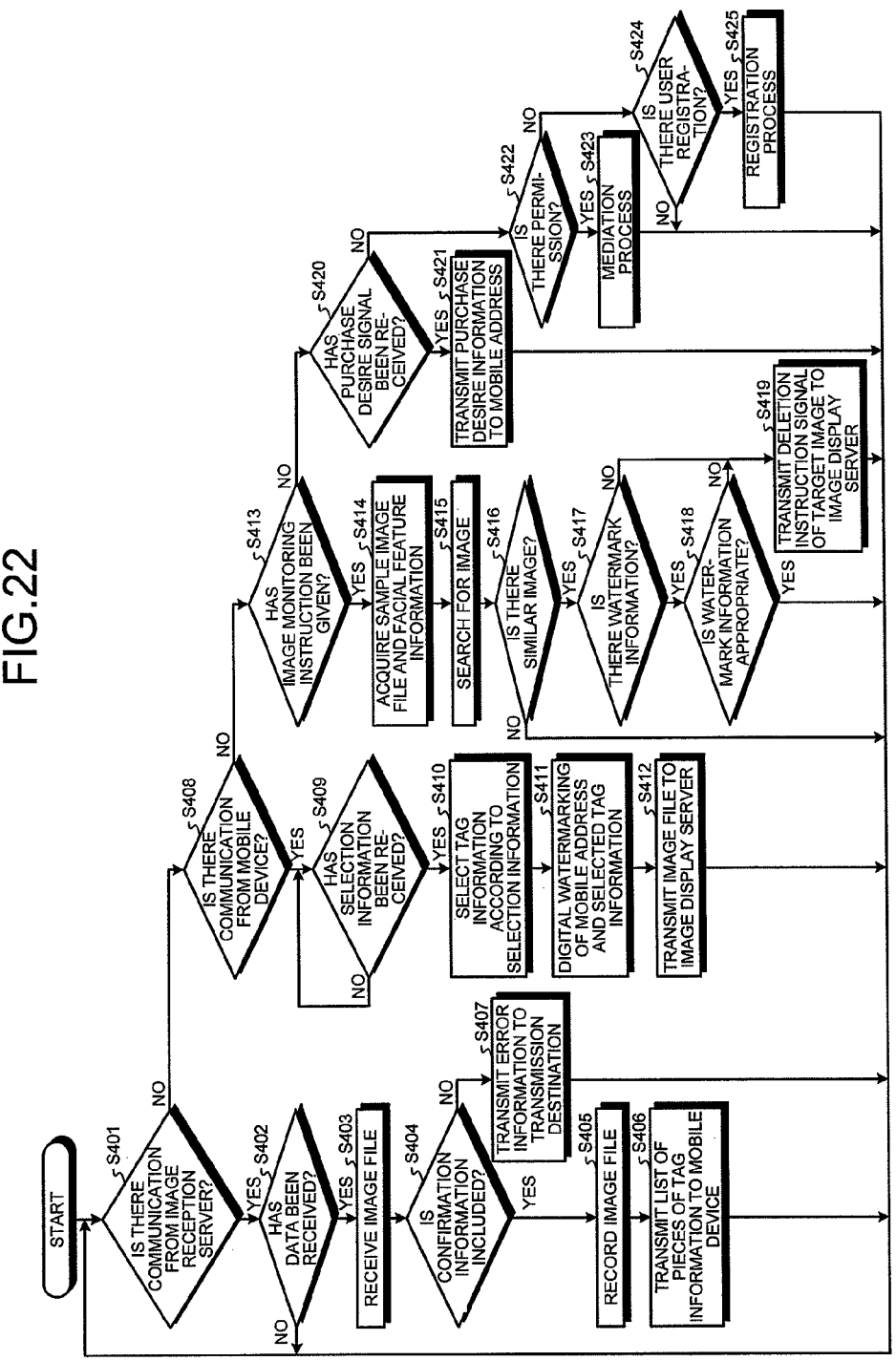
FIG. 22 is a flowchart illustrating a detailed process executed by the management server according to some embodiments.

A detailed process executed by the management server 300 will be described with reference to the flowchart in FIG. 22. As illustrated in FIG. 22, when there is communication from the image reception server 200 (Yes in step S401) and the image reception server 200 receives data (Yes in step S402), the management server controller 304 receives an image file from the image reception server 200 (step S403).

The individual information determining unit 304b preferably determines whether or not the confirmation destination information is included in the image file received from the image reception server 200 at step S404. When the individual information determining unit 304b determines that the confirmation destination information is included in the image file received from the image reception server 200 (Yes in step S404), the management server 300 causes the image file received from the image reception server 200 to be recorded in the image database 303 at step S405.

The management server controller 304 transmits a list of pieces of tag information based on the confirmation destination information to the mobile device 500 at step S406. After step S406, the management server 300 causes the process to return to step S401.

When the individual information determining unit 304b determines that the confirmation destination information is not included in the image file received from the image reception server 200 in step S404 (No in step S404), the management server controller 304 preferably transmits error information indicating that the confirmation destination information is not added to the transmission destination to the image reception server 200 at step S407. In this case, when the individual information determining unit 304*b* determines that there is information in which the tag information added to the image file received from the image reception server 200 matches user data recorded in the user database 302, the management server controller 304 may transmit a list of pieces of tag information to the mobile device 500 using the confirmation destination information of the mobile device 500 recorded in the user database 302. After step S407, the management server 300 causes the process to return to step S401.

When it is determined step S401 that there is no communication from the image reception server 200 (No step S401) but there is communication from the mobile device 500 (Yes in step S408), the management server 300 preferably causes the process to proceed to step S409.

When the mobile device 500 receives selection information (Yes in step S409), the management server controller 304 selects tag information according to the selection information at step S410. For example, when the selection information received from the mobile device 500 is the biological information or the distance distribution information of the tag information, the management server controller 304 selects the biological information or the distance distribution information from pieces of tag information of the image file received from the image reception server 200.

The digital watermark generating unit 304*c* preferably generates the tag information according to the selection information and digital watermark information of the confirmation destination information of the mobile device 500, and adds the information to the image data (step S411). At the same time, the digital watermark generating unit 304*c* preferably deletes or removes the tag information other than the selection information from the image file.

Further, when shooting by the imaging device 100 takes place, it can be very difficult to identify a person who has operated the imaging device 100 to perform shooting. In this regard, in some embodiments, a photographer or user can be associated with the copyright in a one-to-one manner such that the imaging device 100 acquires information specifying a person (photographer or user) who has operated the imaging device 100, such as biological information or input information of a photographer or user who has operated the imaging device 100 at the time of shooting, and the acquired information can be added as tag information of captured image data.

There are cases in which a person (subject or model) to be captured desires to tag, for example, waiver information of portrait rights to image data (captured image) at the time of shooting. In this case, it is necessary for a person who has waived the portrait rights to be the person having the portrait rights. However, when the imaging device 100 acquires, for example, biological information including an image of a face of a person who has waived the portrait rights, in addition to determination as to whether or not the image data matches image data of the person who has waived the portrait rights, by using the biological information (for example, fingerprint information or vein information) of the person who has waived the portrait rights, so-called spoofing in which the portrait right waiver is made by a person other than the portrait right holder can be reliably prevented.

Because biological information specifying a photographer having the copyright or a subject having portrait rights is individual information, most photographers or subjects want individual information specifying an individual, such as biological information, withheld from publication. Therefore, an image file in which individual information specifying an individual, such as biological information that is tagged as tag information, needs be strictly managed.

As described above, special information that requires a photographer or user's careful handling such as individual information (biological information) specifying a subject is processed only in a specially authenticated server and is secured (this relates to route information). In addition, coordination with the mobile device 500 (external device) associated with the owner of the imaging device 100 is performed through a specific server (the management server 300), and thus security can be further improved (this also relates to route information).

As described above, confirmation of image publication to the Internet by the owner of the imaging device 100 or management of photographer, user, or subject information can be properly performed according to a transmission route through which an image file is transmitted or processed. As a result, information or an image file generated by the imaging device 100 of the embodiments can be securely transmitted.

The management server controller 304 preferably transmits the image file to the image display server 400 through the network N and the communication unit 301 (step S412). After step S412, the management server 300 causes the process to return to step S401.

When it is determined in step S409 that no selection information is received from the mobile device 500 (No in step S409), the management server 300 is on standby until selection information is received from the mobile device 500.

When it is determined in step S408 that there is no communication from the mobile device 500 (No in step S408), the management server 300 causes the process to proceed to step S413.

When an instruction for monitoring an image is given from the mobile device 500 or an external device (Yes in step S413), the management server controller 304 acquires a sample image file and facial feature information of the sample image file from the mobile device 500 or the external device (step S414).

The image search unit 304*d* searches for an image uploaded to the network N through the network N and the communication unit 301 based on the sample image file and the facial feature point information (step S415).

When there is an image corresponding to image data of the sample image file or a similar image having similar facial feature point information (Yes in step S416), then digital watermark information is preferably added to image data of the similar image (Yes in step S417), and if the digital watermark information is appropriate (Yes in step S418), the management server 300 causes the process to return to step S401.

When there is an image corresponding to image data of the sample image file or a similar image having similar facial feature information (Yes in step S416) but digital watermark information is not added to image data of the similar image (No in step S417), the management server controller 304 preferably transmits a deletion instruction signal of a target image to the image display server 400 through the network N and the communication unit 301 (step S419). After step S419, the management server 300 causes the process to return to step S401.

When it is determined in step S418 that the digital watermark information is not appropriate (No in step S418), the management server 300 causes the process to proceed to step S419.

When it is determined in step S413 that no instruction for monitoring an image is given from the mobile device 500 or the external device (No in step S413) and an image purchase desire signal is received from the image display server 400 (Yes in step S420), the management server 300 causes the process to proceed to step S421 which will be described below. However, when it is determined in step S413 that no instruction for monitoring an image is given from the mobile device 500 or the external device (No in step S413) but the image purchase desire signal is not received from the image display server 400 (No in step S420), the management server 300 causes the process to proceed to step S422 which will be described below.

In step S421, the management server controller 304 preferably transmits purchase desire information to the mobile device 500 based on address information added to the image file of the purchase desire signal (step S421). As a result, the owner of the mobile device 500 or the imaging device 100 can understand that an image purchaser appears. After step S421, the management server controller 304 causes the process to return to step S401.

When it is determined in step S422 that information indicating permission of the image file from a copyright holder of the image file desired to be purchased is received from the mobile device 500 (Yes in step S422), the management server controller 304 preferably executes a mediation process of bi-directionally transmitting address information of the mobile device 600 of a person who wants to purchase and address information of the mobile device 500 of the copyright holder of the image file (step S423). As a result, the person who wants to purchase and the copyright holder of the image file can acquire information of the other party and directly execute transaction of the image file or the like. After step S423, the management server 300 causes the process to return to step S401.

When it is determined in step S422 that information indicating permission of the image file from the copyright holder of the image file desired to be purchased is not received from the mobile device 500 (No in step S422) and there is user registration (Yes in step S424), the individual information setting unit 304a executes a registration process of registering the user's individual identification information, tag information, owner information of the imaging device 100, and portrait right information to the user database 302 (step S425). After step S425, the management server 300 causes the process to proceed to step S401.

When it is determined in step S422 that information indicating permission of the image file from a copyright holder of the image file desired to be purchased is not received from the mobile device 500 (No in step S422) and there is no user registration (No in step S424), the management server 300 causes the process to proceed to step S401.

Figure 23:
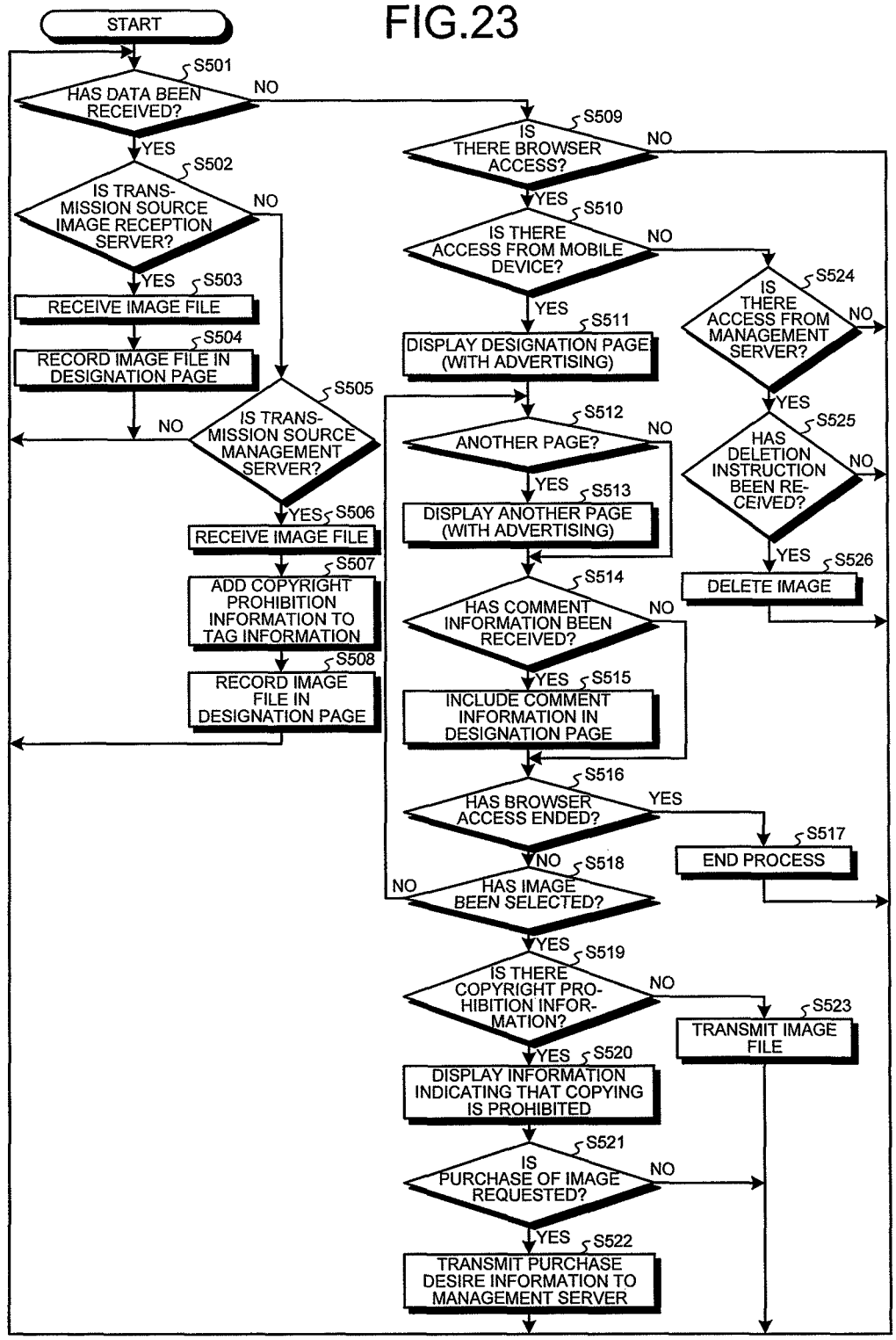
FIG. 23 is a flowchart illustrating a detailed process executed by the image display server according to some embodiments.

A detailed process executed by the image display server 400 will be described with reference to the flowchart illustrated in FIG. 23. As illustrated in FIG. 23, when data is received from the outside via the network N (Yes in step S501) and the transmission source is the image reception server 200 (Yes in step S502), the image display server controller 403 receives an image file from the image reception server 200 (step S503).

Thereafter, the image display server controller 403 preferably causes the image file received from the image reception server 200 to be recorded in the designation page and recorded in the image database 402 (step S504). After step S504, the image display server 400 causes the process to return to step S501.

When it is determined in step S502 that the transmission source is not the image reception server 200 (No in step S502), the image display server 400 causes the process to proceed to step S505.

when it is determined that the transmission source is the management server 300 (Yes in step S505), the image display server 400 causes the process to proceed to step S506 which will be described below. However, when the transmission source is not the management server 300 (No in step S505), the image display server 400 causes the process to return to step S501.

In step S506, the image display server controller 403 receives an image file from the management server 300. The copyright information adding unit 403a preferably adds copyright prohibition information to tag information of the image file at step S507. The image file received from the management server 300 is recorded in the designation page and recorded in the image database 402 at step S508. After step S508, the image display server 400 causes the process to return to step S501.

When it is determined in step S501 that no data is received from the outside via the network N (No in step S501) and there is access to a browser (Yes in step S509), the image display server 400 causes the process to proceed to step S510 which will be described below. However, when it is determined in step S501 that no data is received from the outside via the network N (No in step S501) and there is no access to a browser (No in step S509), the image display server 400 causes the process to return to step S501.

When there is access from the mobile device 500 or the mobile device 600 (Yes in step S510), the display controller 403d displays the designated designation page at step S511. In this case, the display controller 403d preferably adds advertising to the designated designation page, and displays the designated designation page including advertising.

When an instruction signal indicating another page is input (Yes in step S512), the display controller 403d preferably adds advertising to another page in response to the instruction signal, and displays the page including advertising at step S513.

When comment information is received from the mobile device 500 or the mobile device 600 (Yes in step S514), the image display server controller 403 includes the comment information in the designation page, and causes the designation page including the comment information to be recorded in the image database 402 at step S515.

When browser access of the mobile device 500 or the mobile device 600 ends (Yes in step S516), the image display server controller 403 executes an end process of recording the designation page in the image database 402 at step S517. After step S517, the image display server 400 causes the process to return to step S501.

When it is determined in step S516 that browser access of the mobile device 500 or the mobile device 600 does not end (No in step S516), the image display server 400 causes the process to proceed to step S518.

Figure 24:
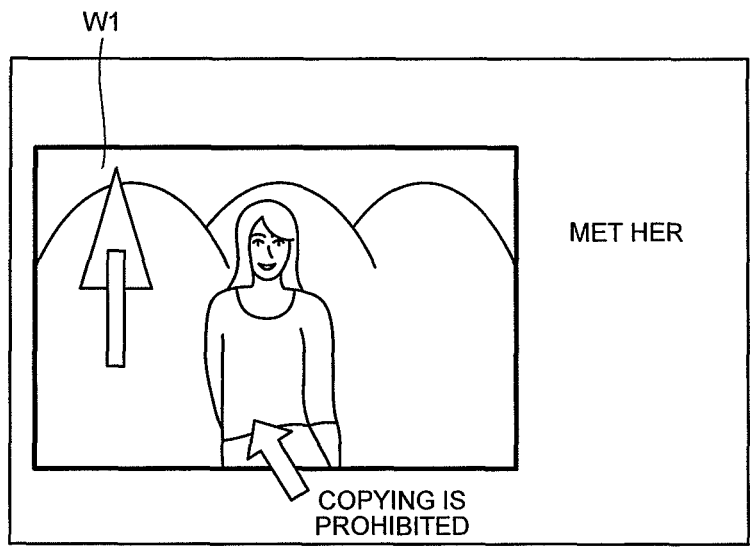
FIG. 24 illustrates an exemplary image on a designation page including copyright information in the image display server according to some embodiments.

When an image is selected through the mobile device 500 or the mobile device 600 (Yes in step S518) and there is copyright prohibition information (Yes in step S519), the display controller 403d displays information indicating that copying is prohibited to be superimposed on the image at step S520. More particularly, as illustrated in FIG. 24, when the user of the mobile device 500 selects the image W1 through the touch panel 503, information indicating that copying is prohibited is preferably displayed to be superimposed on the image W1. As a result, the owner of the mobile device 500 or the mobile device 600 can intuitively understand the selected image is protected by the copyright.

When purchase of an image is requested from the mobile device 600 (Yes in step S521), the image display server controller 403 transmits the purchase desire information to the management server 300 at step S522. After step S522, the image display server 400 causes the process to return to step S501.

When it is determined in step S521 that the mobile device 600 does not request to purchase an image (No in step S521), the image display server 400 causes the process to return to step S501.

Figure 25:
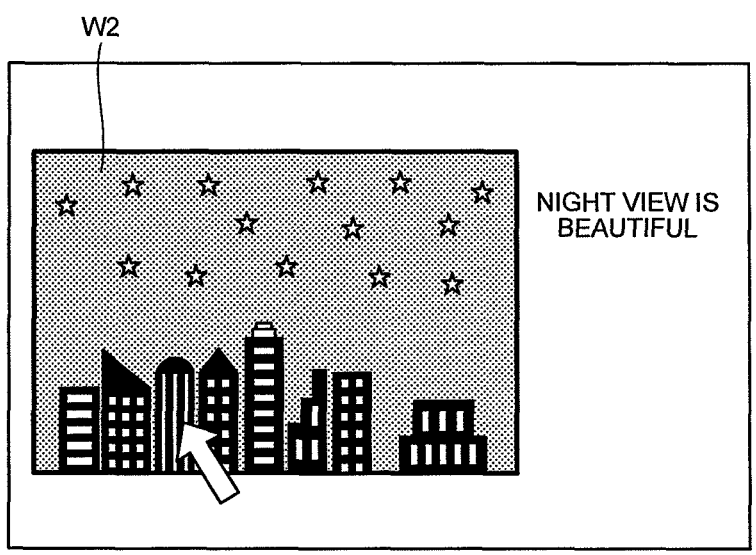
FIG. 25 illustrates an exemplary image on a copyright free designation page in the image display server according to some embodiments.

When it is determined in step S518 that an image is selected (Yes in step S518) and there is no copyright prohibition information (No in step S519), the image display server controller 403 transmits the selected image file to the mobile device 600 at step S523. More particularly, as illustrated in FIG. 25, when the user of the mobile device 600 selects an image W2 through the touch panel 503 and no copyright prohibition information is included in the image W2 (copyright free), the image file of the image W2 is transmitted to the mobile device 600. After step S523, the image display server 400 causes the process to return to step S501.

When it is determined in step S512 that an instruction signal representing another page is not input (No in step S512), the image display server 400 causes the process to proceed to step S514.

When it is determined in step S514 that comment information is not received (No in step S514), the image display server 400 causes the process to proceed to step S516.

When it is determined in step S510 that there is no access from the mobile device 500 or the mobile device 600 (No in step S510), the image display server 400 causes the process to proceed to step S524.

When there is access from the management server 300 (Yes in step S524) and a deletion instruction is received (Yes in step S525), the image data deleting unit 403b deletes an image according to the deletion instruction from the image database 402 at step S526. As a result, an image file that infringes the copyright can be deleted. After step S526, the image display server 400 causes the process to return to step S501.

When it is determined in step S524 that there is no access from the management server 300 (No in step S524), the image display server 400 causes the process to return to step S501.

When it is determined in step S525 that no deletion instruction is received (No in step S525), the image display server 400 causes the process to return to step S501.

According to the above-described embodiments, image data that is not intended to be posted by a photographer or user can be prevented from being posted to a server.

According to some embodiments, as the tag information of the image file transmitted from the imaging device 100 is deleted and the image file is transmitted to the image display server 400 through the image reception server 200, the image file in which the copyright is waived can be transmitted (posted) to the image display server 400.

According to some embodiments, since the tag information is deleted before the imaging device 100 transmits the image file to the image reception server 200, even when another user browses in the designation page of the image display server 400, personal information can be prevented from leaking.

According to some embodiments, an image file is transmitted to the image display server 400 through the image reception server 200 and the management server 300 according to route information of tag information of the image file transmitted from the imaging device 100. Thus, the image file can be transmitted to the image display server 400 in the state in which the copyright is protected.

According to some embodiments, even when a photographer or other person intentionally or innocently infringes the portrait rights of another by taking a picture of a subject or capturing a poster and then transmitting (posts) an image file including image data to the image display server 400, since the management server 300 transmits distance distribution information of tag information to a mobile device of a portrait right holder that is illustrated on a photograph or a poster, it is possible to prevent image data which is not intended by the portrait right holder from being posted to the image display server 400 without permission in advance or immediately after posting is detected.

According to some embodiments, even when an image file including image data captured by a photographer without a subject's permission is transmitted to the image display server 400, the management server 300 gives notification to a mobile device of a subject corresponding a permission ID of tag information, and thus the image file is transmitted to the image display server 400 with at least some basis for having a subject's permission. As a result, image data can be prevented from being published on a web site in a state in which subject's portrait rights are ignored.

According to some embodiments, even when a photographer or user other than the owner of the imaging device 100, for example, an assistant of the owner performs shooting using the imaging device 100, the owner of the imaging device 100 selects personal authentication information and gives approval, and thus an image file can be transmitted to the image display server 400 in the state in which the copyright of the image file is protected.

According to some embodiments, the management server 300 generates a digital watermark of personal authentication information selected by the mobile device 500, and transmits an image file in which individual information used to authenticate an individual with tag information including the digital watermark is deleted to the image display server 400. Thus, even when another user browses in the designation page of the image display server 400, personal information can be prevented from dissemination.

The imaging device of some embodiments can be applied not only to a digital single-lens reflex camera but also to any electronic device that captures an image such as, without limitation, a digital camera with an attachable accessory, a digital video camera, a virtual camera, a mobile telephone or smart phone with an imaging function, a computing device, or a tablet type mobile device.

Programs executed by the imaging device and the management server of some embodiments are file data of an installable format or an executable format, and are provided such that a corresponding program is recorded in a computer readable recording medium such as, without limitation, a CD-ROM, a flexible disk (FD), a CD-R, a DVD (Digital Versatile Disk), a USB medium, or flash memory.

The programs executed by the imaging device and the management server of some embodiments may be configured to be provided such that a corresponding program is stored in a computer connected to a network such as the Internet and downloaded via the network. In addition, the program executed by the imaging device of some embodiments may be configured to be provided or distributed via a network such as the Internet.

The image reception server, the management server, and the image display server of some embodiments are individually operated, but the image reception server, the management server, and the image display server may be operated through a single server.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image file communication system comprising:
a communication network that allows a transmitting device to communicate with a plurality of transceiving devices;
an image file recorded on a non-transitory computer readable recording medium that is readable by the transmitting device, the image file comprising:
electronic image data obtained from capturing an image by an imaging device; and
tag information added to the image file by a controller, the tag information including transmission route information for transmitting the image file to at least one of the plurality of transceiving devices, personal authentication information used for personal authentication when the image file is transmitted to the communication network, and confirmation destination information for an external device associated with an owner of the transmitting device according to the transmission route information; and
the plurality of transceiving devices comprise:
an image reception server that receives the image file transmitted from the transmitting device and transmits the image file based on the tag information;
an image management server that receives the image from the image reception server, manages the image file based on the tag information, and transmits the image file based on the tag information; and
an image display server that receives the image file from the image reception server or the image management server and transmits information relating to the image file in accordance with the tag information to the external device in accordance with the confirmation destination information.

2. The image file communication system of claim 1, wherein the tag information further includes at least one of permission information on portrait rights of a subject included in an image corresponding to the electronic image data, distance distribution information indicating a distribution of distances from the transmitting device to the subject in the image corresponding to the electronic image data, biological information of the subject when the electronic image data is generated, and biological information of a photographer or an owner of the transmitting device when the electronic image data is generated.

3. A transmitting device capable of generating an image file and communicating with a plurality of transceiving devices, the transmitting device comprising:
a tag information adding unit configured to add, to the image file, tag information including transmission route information for transmitting the image file to the plurality of transceiving devices, personal authentication information used for personal authentication when the image file is transmitted to the plurality of transceiving devices, and confirmation destination information for an external device associated with the transmitting device according to the transmission route information; and
a communication unit configured to perform transmission to one of the plurality of transceiving devices based on the transmission route information;
wherein the plurality of transceiving devices comprise:
an image reception server that receives the image file transmitted from the transmitting device and transmits the image file based on the tag information;
an image management server that receives the image from the image reception server, manages the image file based on the tag information, and transmits the image file based on the tag information; and
an image display server that receives the image file from the image reception server or the image management server and transmits information relating to the image file to the external device in accordance with the confirmation destination information.

4. The transmitting device of claim 3, wherein the image file includes image data, and the transmitting device communicates with the plurality of servers via a network.

5. The transmitting device of claim 4, wherein the tag information adding unit is configured to further add to the image file as the tag information, at least one of permission information on portrait rights of a subject included in an image corresponding to the image data, distance distribution information indicating a distribution of distances from the transmitting device to the subject in the image corresponding to the image data, biological information of the subject when the image data is generated, and biological information of a photographer or an owner of the transmitting device when the image data is generated.

6. The transmitting device of claim 4, further comprising a tag information deleting unit configured to delete, based on the transmission route information, the tag information other than the transmission route information when the communication unit transmits the image file to one of the plurality of servers.

7. The transmitting device of claim 4, further comprising:
a permission information input unit configured to receive an input of permission information on portrait rights of a subject included in an image corresponding to the image data; and
a biological detector configured to detect biological information on the subject,
wherein the tag information adding unit is configured to further add to the image file as tag information, the permission information received by the permission information input unit and the biological information detected by the biological detector.

8. The transmitting device of claim 4, further comprising a distance distribution detector configured to detect distance distribution information indicating a distribution of distances from the transmitting device to an object in an image corresponding to the image data,
wherein the tag information adding unit is configured to further add the distance distribution information detected by the distance distribution detector to the image file as the tag information.

9. A non-transitory computer readable recording medium with an executable program recorded thereon, the program instructing a transmitting device having a processor to execute:

communication with another device and transmission of an image file in which content data is recorded;

adding as tag information to the image file transmission route information for transmitting the image file to be published via the Internet, personal authentication information used for personal authentication when the image file is transmitted via the Internet, and confirmation destination information for an external device associated with an owner of the transmitting device according to the transmission route information; and transmitting the image file to a plurality of receiving devices based on the transmission route information, the receiving devices comprise:

an image reception server that receives the image file transmitted from the transmitting device and transmits the image file based on the tag information;

an image management server that receives the image from the image reception server, manages the image file based on the tag information, and transmits the image file based on the tag information; and an image display server that receives the image file from the image reception server or the image management server and transmits information relating to the image file to be published via the Internet to the external device in accordance with the confirmation destination information.

10. The non-transitory computer readable recording medium of claim 9, wherein the image file includes image data, and the transmitting device wirelessly communicates with the other device.

11. A method for communicating image file information in a communication network comprising:

capturing an image by an imaging device to generate image data;

generating an image file including the image data;

recording the image file on a non-transitory computer readable recording medium that is readable by a transmitting device, adding tag information to the image file, the tag information including transmission route information for transmitting the image file to at least one of a plurality of transceiving devices, personal authentication information used for personal authentication when the image file is transmitted to at least one of a plurality of transceiving devices, and confirmation destination information for an external device associated with an owner of the transmitting device according to the transmission route information; and communicating the image file to the plurality of transceiving devices through the communication network, the plurality of transceiving devices comprising:

an image reception server that receives the image file transmitted from the transmitting device and transmits the image file based on the tag information;

an image management server that receives the image from the image reception server, manages the image file based on the tag information, and transmits the image file based on the tag information; and an image display server that receives the image file from the image reception server or the image management server and transmits information relating to the image file in accordance with the tag information to the external device in accordance with the confirmation destination information.

12. The method of claim 11, wherein the tag information further includes at least one of permission information on portrait rights of a subject included in an image corresponding to the image data, distance distribution information indicating a distribution of distances from the transmitting device to the subject in the image corresponding to the image data, biological information of the subject when the image data is generated, and biological information of a photographer or an owner of the transmitting device when the image data is generated.

\* \* \* \* \*